United States Patent
Hayasaka et al.

(10) Patent No.: US 9,952,936 B2
(45) Date of Patent: Apr. 24, 2018

(54) STORAGE SYSTEM AND METHOD OF CONTROLLING STORAGE SYSTEM

(71) Applicant: HITACHI, LTD., Tokyo (JP)

(72) Inventors: Mitsuo Hayasaka, Tokyo (JP); Koji Yamasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 381 days.

(21) Appl. No.: 14/425,675

(22) PCT Filed: Dec. 5, 2012

(86) PCT No.: PCT/JP2012/081566
§ 371 (c)(1),
(2) Date: Mar. 4, 2015

(87) PCT Pub. No.: WO2014/087508
PCT Pub. Date: Jun. 12, 2014

(65) Prior Publication Data
US 2015/0212900 A1    Jul. 30, 2015

(51) Int. Cl.
*G06F 7/00* (2006.01)
*G06F 17/30* (2006.01)
(Continued)

(52) U.S. Cl.
CPC ...... *G06F 11/1453* (2013.01); *G06F 11/1456* (2013.01); *G06F 11/1464* (2013.01);
(Continued)

(58) Field of Classification Search
CPC ............. G06F 17/3015; G06F 11/1464; G06F 2201/845; G06F 11/1469; H04L 67/1097
See application file for complete search history.

(56) References Cited

U.S. PATENT DOCUMENTS 5,990,810 A * 11/1999 Williams .............. G06F 3/0608
341/51
7,155,587 B2 * 12/2006 Eguchi .................... G06F 3/061
711/162
(Continued)

FOREIGN PATENT DOCUMENTS

JP    2009-116839 A    5/2009
JP    2012-093827 A    5/2012
(Continued)

*Primary Examiner* — Daniel Kuddus
(74) *Attorney, Agent, or Firm* — Mattingly & Malur, PC

(57) ABSTRACT

In a storage system for backing up data of an external apparatus, the external apparatus and a storage apparatus collaboratively perform efficient de-duplication. A storage system stores data from the external apparatus in a unit of content, and includes a backup apparatus configured to execute backup processing to create backup data of the data from the external apparatus in the unit of content; and a storage apparatus coupled to the backup apparatus in a communication-enabled manner and configured to store the backup data received from the backup apparatus. A first backup processing part of the backup apparatus determines whether or not a content is already stored in the storage apparatus by using first redundancy determination information that is information for determining whether or not each of contents of the backup data is already stored in the storage apparatus.

10 Claims, 18 Drawing Sheets

(51) Int. Cl.
*G06F 11/14* (2006.01)
*H04L 29/08* (2006.01)

(52) U.S. Cl.
CPC ...... *G06F 11/1469* (2013.01); *G06F 17/3015* (2013.01); *H04L 67/1097* (2013.01); *G06F 2201/845* (2013.01)

(56) References Cited

U.S. PATENT DOCUMENTS

| | | | | |
|---|---|---|---|---|
| 7,739,465 B2* | 6/2010 | Kameyama | ......... | G06F 11/1076 711/161 |
| 7,894,334 B2* | 2/2011 | Wen | ...................... | H04L 41/044 370/217 |
| 7,900,013 B2* | 3/2011 | Takaoka | .............. | G06F 11/3447 711/162 |
| 8,010,496 B2* | 8/2011 | Okada | ................. | G06F 11/1456 707/640 |
| 8,069,365 B2* | 11/2011 | Gu | .......................... | H04L 69/40 714/4.1 |
| 8,812,460 B2* | 8/2014 | Tosaka | .............. | G06F 17/30156 707/610 |
| 2008/0189466 A1* | 8/2008 | Hemmi | ................. | G06F 11/108 711/4 |
| 2009/0106407 A1* | 4/2009 | Kodama | ............. | G06F 11/1451 709/223 |
| 2010/0312752 A1* | 12/2010 | Zeis | ..................... | G06F 11/1464 707/640 |
| 2012/0102000 A1* | 4/2012 | Tosaka | .............. | G06F 17/30156 707/654 |
| 2012/0159232 A1* | 6/2012 | Shimada | ............. | G06F 11/1662 714/3 |
| 2012/0185447 A1* | 7/2012 | Zhang | ............... | G06F 17/30156 707/693 |
| 2012/0260051 A1* | 10/2012 | Maki | .................... | G06F 3/0611 711/162 |
| 2012/0311603 A1* | 12/2012 | Kudo | .................... | G06F 3/0611 718/105 |
| 2014/0122818 A1* | 5/2014 | Hayasaka | ........ | G06F 17/30156 711/162 |

FOREIGN PATENT DOCUMENTS

| | | |
|---|---|---|
| JP | 2012-150792 A | 8/2012 |
| JP | 2012-529684 A | 11/2012 |
| WO | 2012/101674 A1 | 8/2012 |

* cited by examiner

| CONTENT ID 371 | FINGER PRINT 372 | CONTAINER ID 373 | CONTENT OFFSET 374 | CHUNK LENGTH 375 | |
|---|---|---|---|---|---|
| $f_1$ | $FP_a$ | $C_f$ | offset a | length a | |
| $f_1$ | $FP_f$ | $C_c$ | offset f | length f | ⎬ $S_{f1}$ (370) |
| $f_2$ | $FP_b$ | $C_g$ | offset b | length b | |
| $f_2$ | $FP_c$ | $C_g$ | offset c | length c | ⎬ $S_{f2}$ (370) |
| $f_2$ | $FP_f$ | $C_c$ | offset f | length f | |
| $f_3$ | $FP_b$ | $C_g$ | offset b | length b | |
| $f_3$ | $FP_c$ | $C_g$ | offset c | length c | |
| $f_3$ | $FP_d$ | $C_h$ | offset d | length d | |
| $f_3$ | $FP_e$ | $C_h$ | offset e | length e | ⎬ $S_{f3}$ (370) |
| $f_3$ | $FP_f$ | $C_c$ | offset f | length f | |
| $f_n$ | CONTENT INDEX $S_{fn}$(370) | | | | |

FIG. 5

STORAGE SYSTEM AND METHOD OF CONTROLLING STORAGE SYSTEM

TECHNICAL FIELD

The present invention relates to a storage system for storing data from an external apparatus and a method of controlling the storage system.

BACKGROUND ART

A storage apparatus is coupled to an external apparatus such as a host computer via a communication network. The storage apparatus of this type includes, for example, multiple hard disk drives (HDD) as storage devices for storing data. For the purpose of reducing costs required for storage media, data volume reduction processing is performed in the course of storing data into a storage device. The reduction of data volume is done through file compression or de-duplication. The file compression reduces the data volume by compressing data segments having identical data within a single file. On the other hand, the de-duplication reduces the total data volume in a file system or a storage system by detecting data segments having identical data not only within a single file but also among files and by compressing the detected data segments.

In the following description, a "chunk" denotes a unit-data segment that is a unit for de-duplication. In addition, a "container" denotes a set of data consisting of two or more chunks. In general, chunks closely related to each other are gathered in a container for efficient execution of the de-duplication. Moreover, a "container index" denotes a table created for each container and including records of hash values calculated for the respective chunks stored in the container. In addition, a "content" denotes a logically-grouped set of data that is a unit for storage in the storage device. Types of contents include not only general files, but also an aggregate of general files, such as an archive file, a backup file and a virtual volume file.

For storing a content into a storage apparatus from a host computer via a communication network, there have been proposed techniques of performing efficient data storage processing through reduction in a data transfer volume by making redundancy determination in advance as to whether each chunk is already stored in the storage apparatus and by sending only chunks determined as not stored. These techniques are described in Patent Literatures 1 and 2, for example.

CITATION LIST

Patent Literature

[PTL 1] U.S. Pat. No. 5,990,180
[PTL 2] International Patent Application Publication No. WO2012/101674

SUMMARY OF INVENTION

Technical Problem

For the redundancy determination of chunks, there are two determination methods; one is done by a host computer, and the other is done by a storage apparatus.

For example, above Patent Literature 1 describes a method in which the storage apparatus makes the redundancy determination, and the host computer acquires the result of the redundancy determination and stores only new chunks into the storage apparatus.

In the de-duplication method in Patent Literature 1, however, the host computer requests the storage apparatus to make redundancy determination for all the chunks. To this end, the host computer needs to transmit information necessary for the redundancy determination to the storage apparatus and receive the redundancy determination results from the storage apparatus. In this case, the performance is lowered by an amount corresponding to a data roundtrip between the host computer and the storage apparatus, as compared with the method in which the host computer makes redundancy determination alone.

In contrast, Patent Literature 2 describes a method in which the host computer makes the redundancy determination and stores new chunks into the storage apparatus based on the determination results.

In the de-duplication method in Patent Literature 2, however, the host computer needs to store information for use in the redundancy determination for all the data stored from the host computer into the storage apparatus. In this de-duplication method, for example, as stored data increases, the information for use in the redundancy determination increases in size and accordingly places a larger burden on the disk capacity of the host computer, which makes the de-duplication inefficient in some cases.

In view of these circumstances, the present invention aims to provide a storage system and a method of controlling the storage system, which enable efficient de-duplication through collaboration between an external apparatus and a storage apparatus.

Solution to Problem

In order to solve the forging problem and other problems, one aspect of the present invention provides a storage system to store data from an external apparatus in a unit of content, the storage system including a backup apparatus configured to execute backup processing to create backup data of the data from the external apparatus in the unit of content, and a storage apparatus coupled to the backup apparatus in a communication-enabled manner and configured to store the backup data received from the backup apparatus. The backup apparatus includes first redundancy determination information that is information for determining whether or not a content of the backup data is already stored in the storage apparatus, and a first backup processing part configured to determine whether or not the content is already stored in the storage apparatus by using the first redundancy determination information. The storage apparatus includes second redundancy determination information that is information for determining whether or not the content of the backup data is already stored in the storage apparatus, and a second backup processing part configured to determine whether or not the content is already stored in the storage apparatus by using the second redundancy determination information. When the first backup processing part determines that the content of the backup data is not stored in the storage apparatus but the second backup processing part determines that the content is stored in the storage apparatus, the second backup processing part sends the second redundancy determination information to the backup apparatus, and the first backup processing part of the backup apparatus incorporates the received second redundancy determination information into the first redundancy determination information.

Advantageous Effects of Invention

According to the present invention, provided are a storage system and a method of controlling the storage system, which enable efficient de-duplication through collaboration between an external apparatus and a storage apparatus. Problems, configurations and effects other than those described above will be clarified through the following description of embodiments.

BRIEF DESCRIPTION OF DRAWINGS

FIG. 5 is a diagram illustrating a configuration example of a content index used in the restore processing of the storage system 1.

DESCRIPTION OF EMBODIMENTS

Hereinafter, embodiments of the present invention are described based on the drawings. It should be noted that the present invention is not limited to the following embodiments, but can be altered variously within the technical idea of the present invention.

First Embodiment

Configuration of Storage System in First Embodiment

Figure 1:
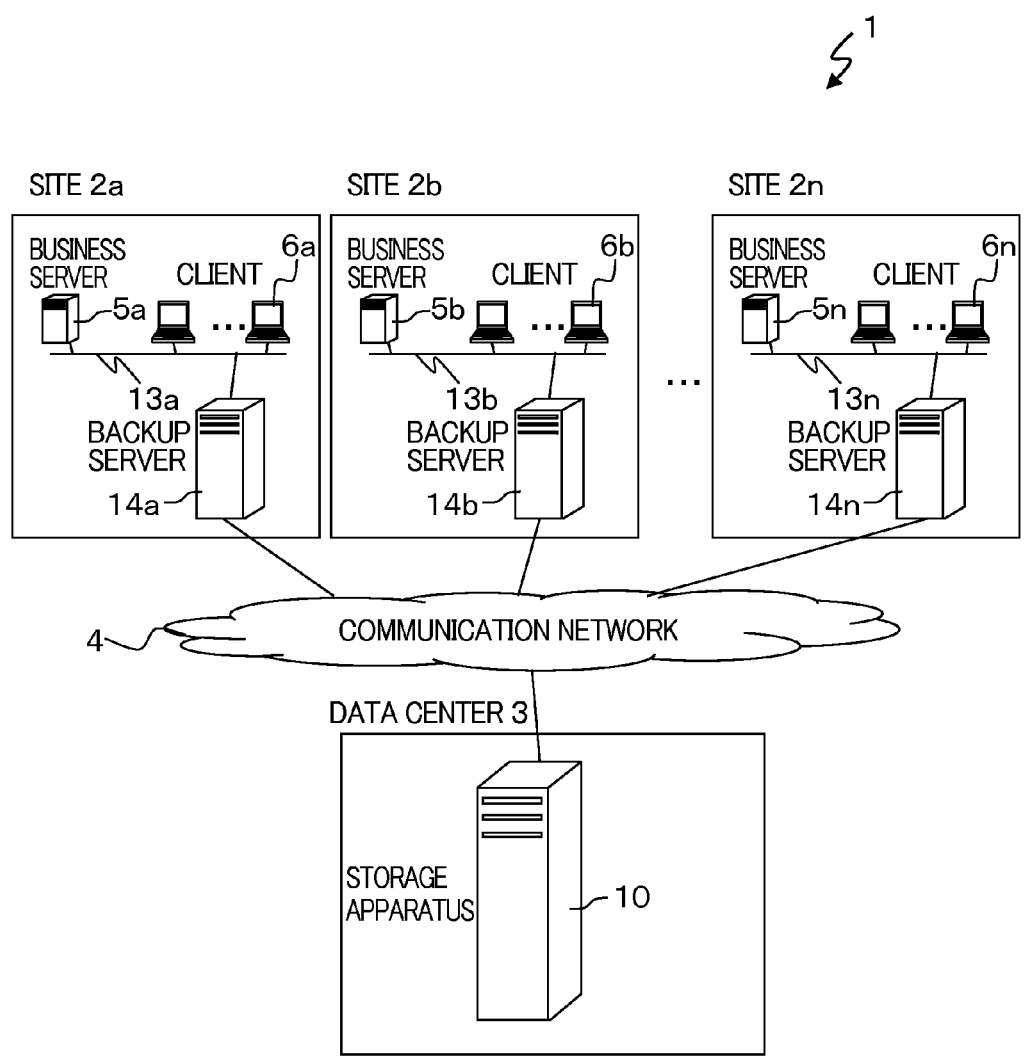
FIG. 1 is a diagram illustrating an overall configuration of a storage system 1 according to a first embodiment of the present invention.

FIG. 1 illustrates an overall configuration of a storage system 1 according to a first embodiment of the present invention. This storage system 1 includes backup servers 14 (14a, 14b, . . . , 14n) installed in multiple sites 2 (2a, 2b, . . . , 2n), respectively, and a storage apparatus 10 installed in a data center 3. In this description, the signs a, b, . . . , n are omitted in some cases where general description for each site is provided without distinction among the sites.

The multiple sites 2 and the data center 3 are coupled to each other via a communication network 4. The communication network 4 can be formed of an appropriate communication line including, for example, a WAN (wide area network), a LAN (local area network), the internet, a public line or a private line. Each of the sites 2 includes a business server 5 (5a, 5b, . . . , 5n), clients 6 (6a, 6b, . . . , 6n), and a backup server 14 (14a, 14b, . . . , 14n). The business server 5, the clients 6, and the backup server 14 are coupled to each other in a communication-enabled manner via a communication network 13 (13a, 13b, . . . , 13n) such as a LAN, for example.

The business server 5 is a computer configured to receive a request from each of the clients 6, and provide a service corresponding to the request. The business server 5 includes a processor such as a CPU (Central Processing Unit), a memory such as a RAM (Random Access Memory) or a ROM (Read Only Memory), an auxiliary storage device (not illustrated) such as a HDD (Hard Disk Drive) or a SSD (Solid State Drive), and the like. The client 6 is also a computer having substantially the same configuration as the business server 5, and functions as a terminal for a user who makes use of services provided by the business server 5.

On a regular basis, the backup server 14 backs up data of the business server 5 and the clients 6 coupled to the backup server 14 in each of the sites 2, and sends the backup data to the data center 3. In addition, in response to a request from either of the business server 5 and the client 6, the backup server 14 performs data restore from the data center 3 into the business server 5 or client 6.

In the data center 3, the storage apparatus 10 stores data received from the multiple backup servers 14 into a storage medium of the storage apparatus 10. Moreover, in response to a request from any of the backup servers 14, the storage apparatus 10 loads data stored in the storage medium and sends the data to the backup server 14.

In the storage system 1 of this embodiment, the backup servers 14 installed in the respective sites 2 and the storage apparatus 10 installed in the data center 3 collaboratively perform data de-duplication efficiently.

Figure 2:
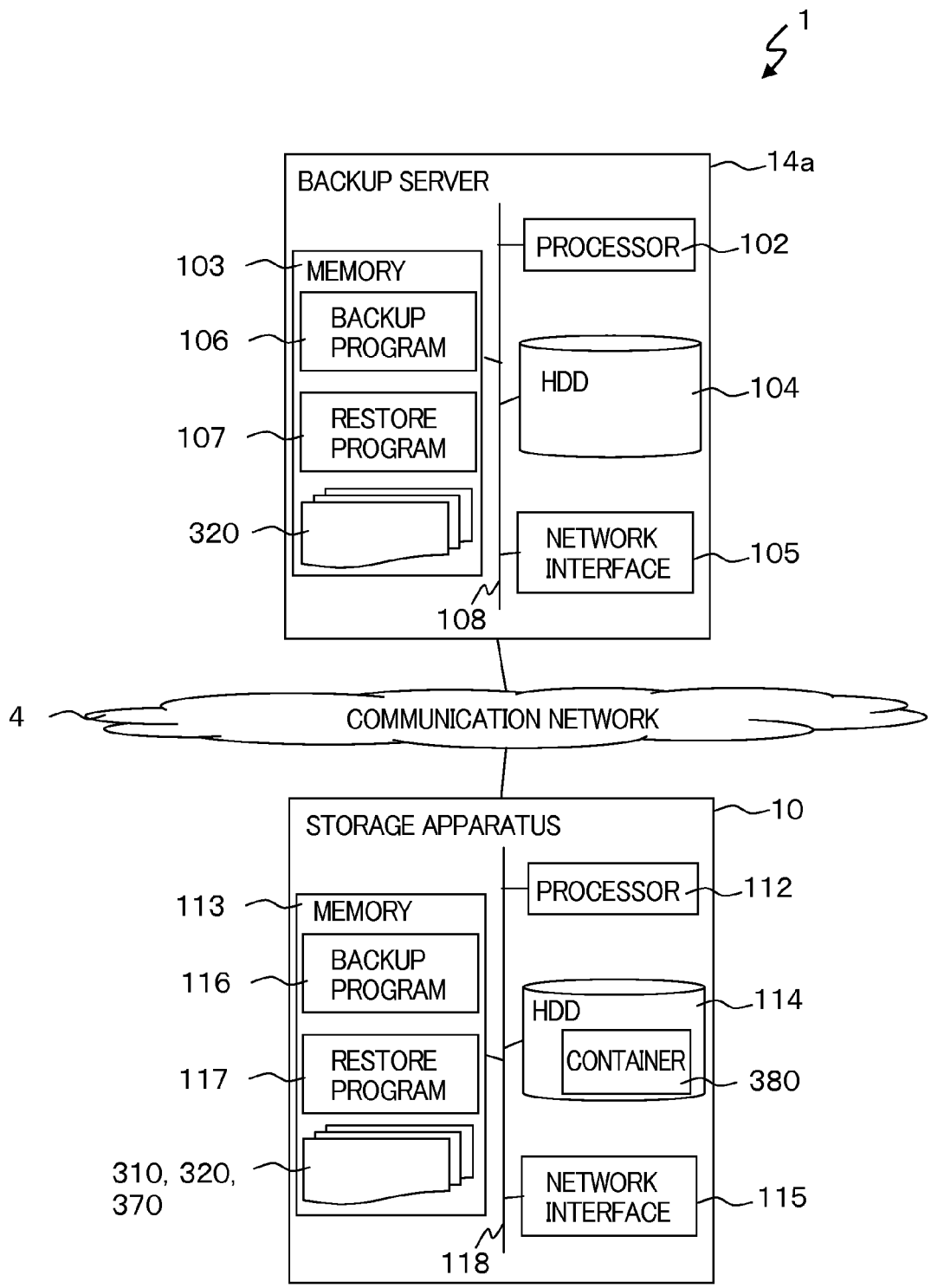
FIG. 2 is a block diagram illustrating configurations of a backup server and a storage apparatus according to the first embodiment.

FIG. 2 is a block diagram illustrating configuration examples of the backup server 14a installed in the site 2a and the storage apparatus 10 installed in the data center 3 in the storage system 1 illustrated in FIG. 1. FIG. 2 illustrates only the backup server 14a, but the other backup servers 14b, . . . , 14n installed in the sites 2b to 2n have substantially the same configuration.

To begin with, the configuration example of the backup server 14a is described. As illustrated in FIG. 2, the backup server 14a mainly includes a processor 102 such as a CPU (Central Processing Unit), a memory 103 such as a RAM (Random Access Memory) or a ROM (Read Only Memory), and an auxiliary storage device 104 such as a HDD (Hard Disk Drive) or a SSD (Solid State Drive) (the auxiliary storage device 104 will be referred to as a "HDD" below), and a network interface 105, such as a NIC (Network Interface Card), which is a communication interface with the communication network 4. The processor 102, the memory 103, the HDD 104, and the network interface 105 are coupled to each other in a communication-enabled manner via a system bus 108.

The processor 102 functions as an arithmetic processing unit including the CPU and the like, and controls the operations of the backup server 14a in accordance with programs, operational parameters and the like stored in the memory 103.

The memory 103 stores a backup program 106 and a restore program 107 on the backup server 14 side. Moreover, the memory 103 is used to store various kinds of information loaded from the HDD 104, and is also used as a work memory for the processor 102. The HDD 104 stores various kinds of software, management information, backup data, and the like. Incidentally, the backup program 106 and the restore program 107 may be stored in the HDD 104 and are loaded from the HDD 104 to the memory 103 when the processor 102 executes these programs.

The memory 103 also stores a container index 320 (first redundancy determination information) that is a table to which the backup program 106 and the restore program 107 reference while running. Instead, the container indexes 320 may be rolled out to the HDD 104 and rolled in the memory 103 as needed when the backup program 106 and the restore program 107 reference thereto.

Next, description is provided for the programs executed by the backup server 14a. The backup program 106 provides functions to determine backup data and perform data processing such as redundancy determination processing, and sends backup data to the storage apparatus 10 via the network interface 105. Moreover, the backup program 106 receives information necessary for the redundancy determination processing from the storage apparatus 10 via the network interface 105.

The restore program 107 receives backup data necessary for restore processing from the storage apparatus 10 via the network interface 105 and restores the backup data to original data.

Next, the configuration example of the storage apparatus 10 is described. As similar to the backup server 14a, the storage apparatus 10 mainly includes a processor 112, a memory 113, a HDD 114, and a network interface 115. The processor 112, the memory 113, the HDD 114, and the network interface 115 are coupled to each other in a communication-enabled manner via a system bus 118.

The processor 112 functions as an arithmetic processing unit including the CPU and the like, and controls the operations of the storage apparatus 10 in accordance with programs, operational parameters and the like stored in the memory 113.

The memory 113 stores a backup program 116 and a restore program 117 on the storage apparatus 10 side. Moreover, the memory 113 is used to store various kinds of information loaded from the HDD 114, and is also used as a work memory for the processor 112. The HDD 114 stores various kinds of software, management information, backup data, and the like. The HDD 114 stores various kinds of software, management information and data after de-duplication.

The memory 113 also stores a chunk index 310, a container index 320, and a content index 370 that are tables to which the backup program 116 and the restore program 117 reference while running. Instead, the chunk index 310, the container index 320 and the content index 370 may be rolled out to the HDD 114 and rolled in the memory 113 as needed when the backup program 116 and the restore program 117 reference thereto. The chunk index 310, the container index 320 and the content index 370 constitute second redundancy determination information.

Next, description is provided for the programs executed by the storage apparatus 10. The backup program 116 performs de-duplication on data received from the backup server 14a and stores the data after the de-duplication into the HDD 114. The backup program 116 sends information necessary for the backup server 14a to execute the redundancy determination processing to the backup server 14a via the network interface 115.

The restore program 117 loads from the HDD 114 data corresponding to a restore request from the backup server 14a and sends the data to the backup server 14a via the network interface 115.

Outlines of Backup Processing and Restore Processing

Subsequently, description is provided for outlines of backup processing and restore processing according to this embodiment.

Outline of De-Duplication Function Installed in Storage Apparatus 10

First, the outline of a de-duplication function according to this embodiment is described. The backup program 106 of the backup server 14 and the backup program 116 of the storage apparatus 10 according to this embodiment are equipped with a processing function to reduce a data volume of backup target data. The reduction of data volume is done through data processing such for example as file compression and de-duplication. The file compression is processing to reduce the data volume by compressing data segments (unit-data segments) having identical data within a single file. On the other hand, the de-duplication is processing to reduce the total data volume of data stored in a file system, a storage system or the like by compressing data segments having identical data detected not only within a single file, but also among files.

In the description of this embodiment, a data segment as a unit for de-duplication on backup data is called a "chunk," and a set of data consisting of multiple chunks is called a "container." In addition, a logically-grouped set of data that is a unit for storage in a storage device is called a "content." Types of contents include not only general files, but also a collection of general files, such as an archive file, a backup file and a virtual volume file.

A container is formed to include a set of chunks closely related to each other. For example, each container is set in advance to have a predetermined number of chunks or a predetermined data volume, and chunks generated from a single content or two or more contents are gathered in the container until the container is filled up. In this way, it is possible to form a container in consideration of the locality of data. In other words, in the case of restoring backup data of a particular content to the original data, if once a container which stores the first chunk of the content is identified, it is highly possible to acquire the following chunks from the same container. Hence, it is expected to reduce the processing of loading different containers from the HDD 114 to the memory 113 for the purpose of restoring a particular content.

In general, the size of a single chunk is several kilo bytes or more. For this reason, the execution of the redundancy determination processing requires a long processing time and high costs if the chunks themselves are compared with each other one by one from the first chunk. To avoid this, the storage apparatus 10 according to this embodiment uses message digests of chunks and thereby enables execution of the redundancy determination processing within a short time at low costs. The message digest is a technique of outputting a digest with a fixed length in response to an input of data with an arbitrary length. In this description, an output result of the message digest is referred to as a "finger print (FP)." The finger print can be acquired by using an arbitrary hash function. As this hash function, a preferably usable one is a hash function that is highly likely to determine hash values, such for example as SHA256, which have very high randomness and unique to respective chunks.

To begin with, description is provided for a de-duplication method for each chunk in the backup program 106 of the backup server 14.

Before sending a certain chunk to the storage apparatus 10, the backup program 106 of the backup server 14 determines whether or not the chunk to be sent is a chunk having the same data as that already stored in the storage apparatus 10 (hereinafter called a "redundant chunk") or a chunk not stored yet (hereinafter called a "new chunk"). Here, since the backup server 14 does not have the information of all the chunks stored in the storage apparatus 10, the backup server 14 may wrongly determine a redundant chunk as a new chunk in some cases.

Then, when determining that the chunk to be sent is a new chunk, the backup program 106 sends the chuck and the finger print (hash value) of the chunk to the storage apparatus 10. When the backup server 14 determines the chunk as the new chunk, the storage apparatus 10 also performs de-duplication for the chunk as described later, and therefore the redundant chunk is not registered redundantly. On the other hand, when determining the chunk as a redundant chunk, the backup program 106 sends the storage apparatus 10 link information indicating the storage location of the chunk instead of sending the chuck to the storage apparatus 10.

Next, description is provided for a de-duplication method for each chunk of the backup program 116 of the storage apparatus 10.

Before storing a certain chunk received from the backup server 14 into the HDD 114, the backup program 116 of the storage apparatus 10 determines whether or not the received chunk is a redundant chunk that is a chunk having the same data as that of a chunk already stored in the HDD 114 or a new chunk not stored yet in the HDD 114.

When determining that the received chunk is a new chunk, the backup program 116 directly stores the chunk into the HDD 114. On the other hand, when determining that the received chunk is a redundant chunk, the backup program 116 stores the link information indicating the storage location of the redundant chunk into the HDD 114, instead of storing the chunk into the HDD 114. Alternatively, when receiving the link information of the redundant chunk from the backup server 14, the backup program 116 directly stores the link information into the HDD 114.

In the foregoing way, the backup program 106 of the backup server 14 and the backup program 116 of the storage apparatus 10 according to this embodiment repeatedly execute the de-duplication of chunks in collaboration with each other to prevent the duplicate registration of redundant chunks. This de-duplication of redundant chunks leads to a reduction in a used capacity of the HDD 114 and speed-up of the backup processing.

As described above, a "container" is a transaction unit for data storage into the HDD 114, and includes multiple chunks into which a single content or two or more contents are split. In addition, the backup program 116 of the storage apparatus 10 creates a container index for each container to manage the locations of the respective chunks included in the container. In the container index, the offset of a chunk (the location of the chunk in the container) and the size of the chunk are stored. The container index is used for redundancy determination of chunks.

In addition, the backup program 116 of the storage apparatus 10 also creates a chunk index. The chunk index is a table indicating which container index stores each of chunks generated by splitting backup data. The storage apparatus 10 creates the chunk index when determining a container where to store a chunk. During execution of the backup processing, the chunk index is used to determine which container index to use for the redundancy determination of a chunk. The details of the container index and the chunk index will be described later.

In this embodiment, the finger prints of the respective chunks are stored in the foregoing container index, and the finger prints of chunks are compared with each other in the redundancy determination processing. This comparison leads to speed-up and cost-down of the redundancy determination processing as compared with the case where chunks are compared with each other on a bit-by-bit basis.

Incidentally, this embodiment may use a write-once storage device for the purposes of ensuring the integrity of data and implementing highly-reliable backup processing. In the write-once storage device, data can be written only once, but the written data can be read any number of times. Since data written into a write-once storage device is neither erasable nor changeable, the device of this type is suitable to data archives for preservation of evidence. As the write-once storage device, there is an optical disc device using a ROM optical disc, for example. In general, a magnetic disk device is not a write-once storage device because data written therein can be updated. However, the magnetic disk device may be used as a write-once storage device if a file system, a driver unit and the like in the device are configured to only allow appending of data (in other words, prohibit overwriting of data). In this embodiment, it is preferable to principally use a write-once hard disk drive suitable for data backup as the storage device for backup.

The foregoing container is set in advance to have a predetermined number of chunks or a predetermined data volume. Thus, chunks are gathered on the memory 113 until the container is filled up, and the chunks for each container are written to the storage device (the HDD 114) for backup when the container is filled up. For example, when a write-once hard disk drive is used as the storage device, the storage apparatus 10 appends chunks in a container on the memory 113 until the container is filled up. At the same time, the storage apparatus 10 creates the container index for managing the locations of chunks in the container and the chunk index for managing correspondences between the chunks and the container indexes. Note that the backup data includes a universal chunk which always appears in every backup generation, and the universal chunk is stored in a container prepared at the initial backup processing.

Configurations of Various Indexes in this Embodiment

Figure 3:
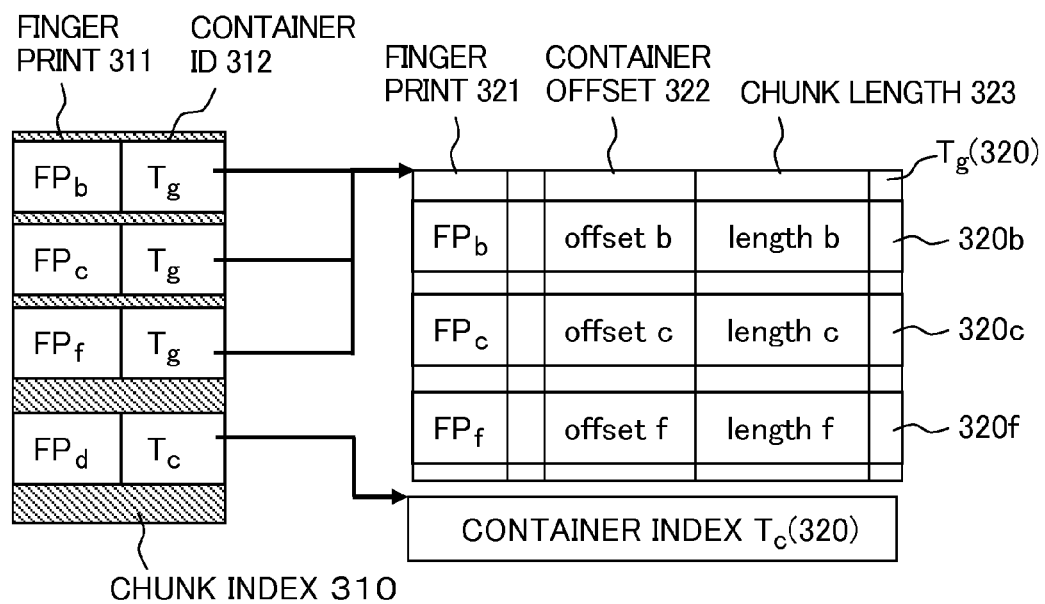
FIG. 3 is a diagram illustrating a configuration example of a container index and a chunk index used in backup processing of the storage system 1.
Figure 4:
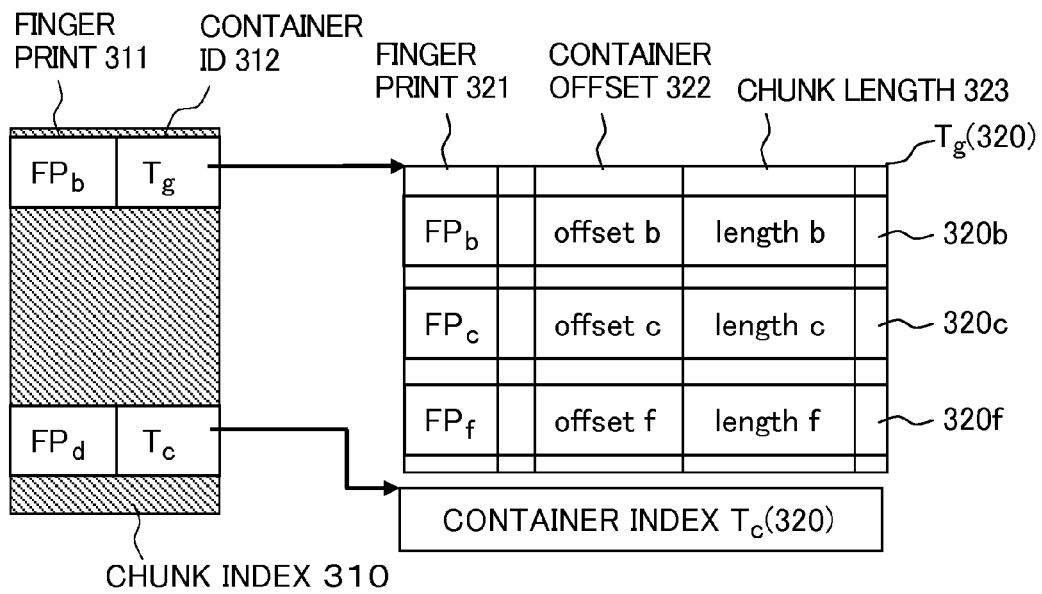
FIG. 4 is a diagram illustrating a configuration example of a container index and a chunk index used in restore processing of the storage system 1.

Next, description is provided for configuration examples of the chunk index 310 and the container index 320 in this embodiment. FIGS. 3 and 4 illustrate the configuration example of the container index 320 and the configuration example of the chunk index 310 used in the backup processing and the restore processing in this embodiment. The container index 320 is a table created on a container-by-container basis. The chunk index 310 is a table for managing chunks stored in containers.

FIG. 3 illustrates a container index Tg(320) created for a particular container among the container indexes 320. The container index Tg(320) includes items of a finger print 321, a container offset 322, and a chunk length 323.

The finger print 321 stores a finger print (a hash value calculated through an appropriate hash function in this embodiment) of each chunk. The container offset 322 stores an offset value giving the head position of each chunk in the container. The chunk length 323 stores information indicating a chunk length. In short, each row of the container index Tg (320) stores management information on a chunk. The container index Tg (320) illustrated in FIG. 3 stores management information 320b on a chunk b, management information 320c on a chunk c, and management information 320f on a chunk f. A letter indicating each chunk is added as a suffix to the management information on the chunk. For example, the fingerprint 321 calculated for the chunk b is expressed as FPb.

Multiple container indexes 320 are managed by use of the chunk index 310. In the chunk index 310, a container ID 312 that is a code for distinguishing a container from other containers, and a fingerprint 311 of each chunk are recorded in association with each other. The container ID 312 herein is also used as pointer information based on which the container index 320 can be referenced to. In this embodiment, the container ID 312 and the corresponding container index 320 use a common identifier called a UUID (Universally Unique IDentifier).

Note that whether or not to reference to the chunk index 310 may be determined based on a processing result of filter processing for identifying whether or not a chunk is a new chunk. More specifically, for a chunk certainly unrecorded in the chunk index 310, reference processing to the chunk index 310 may be skipped entirely and the chunk may be directly stored in a new container. If this processing method is employed, the number of times the backup program 116 of the storage apparatus 10 references to the chunk index 310 can be reduced, and accordingly the speed-up of the backup processing can be further enhanced.

Here, for example, let us assume that four files of the container 380, the container index 320, the chunk index 310, and a content index 370 are stored under four directories, respectively, in the HDD 114 of the storage apparatus 10.

Container/uuid-Cf: Container main body
ContainerIndex/uuid-Cf: Container index database
ChunkIndex/Most-significant N bits of fp: Chunk index database
Contents/uuid-Cf: Content index database In the example in FIG. 3, the finger prints 311 and the container IDs 312 of all the chunks are registered in the chunk index 310, but the number of registered chunks may be reduced. As described above, each container 380 is formed in consideration of the locality of data. In addition, the backup data includes many data segments that are identical or only partially corrected among the backup generations. For this reason, if a chunk stored in a certain container 380 is included in a particular content, the other chunks in the same container are very highly likely to be stored in the same content. Hence, after the container index 320 is searched out for a certain chunk from the chunk index 310, the redundancy determination on the following chunks can be made by using the container index 320 thus searched out. FIG. 4 illustrates an example of the container indexes 320 and the chunk index 310 in the case where the number of chunks registered in the chunk index 310 is reduced.

Here, let us consider the execution of the backup processing for a content including a chunk b, a chunk c, and a chunk f under the condition that the container index Tg(320) is not expanded on the memory 113 of the storage apparatus 10, for example. Firstly, the backup program 116 of the storage apparatus 10 searches the chunk index 310 by using the finger print FPb of the chunk b. In the case of FIG. 3, the finger print FPb is associated with the container ID Tg(320). The backup program 116 loads the container index Tg(320) from the HDD 114, and expands the container index Tg (320) on the memory 113. Then, the backup program 116 can make the redundancy determination on the chunk c and the chunk f by using the expanded container index Tg (320).

When the number of chunks registered in the chunk index 310 is reduced as described above, the storage capacity and memory usage necessary for the de-duplication can be reduced. In addition, the reduction in the number of chunks registered in the chunk index 310 leads to the speed-up of searching for the finger print 311 corresponding to any chunk.

Next, with reference to FIG. 5, description is provided for a configuration example of the content index 370 used during execution of the restore processing. The content index 370 is a table created for each content to manage chunks included in the content. The content index 370 includes a content ID 371, a finger print 372, a container ID 373, a content offset 374, and a chunk length 375.

The content ID 371 stores information for distinguishing a content from the other contents. The finger print 372 stores a finger print of each chunk (a hash value calculated for each chunk by using an appropriate hash function). The container ID 373 stores identification information for distinguishing a container storing each chunk from the other containers. The content offset 374 stores information indicating the location of each chunk in the content. The chunk length 375 stores information indicating a length of each chunk.

FIG. 5, for example, illustrates $S_{f1}(370)$, $S_{f2}(370)$, $S_{f3}(370)$, and $S_{fn}(370)$ as examples of the content indexes. For example, by using the information $S_{f3}(370)$ corresponding to a content $f_3$, it can be known that the content $f_3$ can be reconstructed from chunks b, c, d, e, and f, and it can be also known at which location each of the chunks b to f is stored in the content $f_3$ based on the content offset 374 and the chunk length 375.

The content offset 374 and the chunk length 375 of a content for which the content index 370 is formed indicate logical allocation of each chunk in the content. Also, the container offset 322 and the chunk length 323 in the foregoing container index 320 (FIG. 3) indicate a logical allocation of each chunk in each container.

During execution of the restore processing, the restore program 117 of the storage apparatus 10 acquires the container ID 373 of each chunk in reference to the content index 370, and searches for the container index 320 by using the container ID 373. Then, on the basis of the storage location information of each chunk stored in the container index 320, the restore program 117 acquires the chunks from the container 380 loaded from the HDD 114. Thereafter, the restore program 117 reconstructs the content of a restore target according to the logical allocations in the content index 370.

Outline of De-Duplication Function Installed in Storage System 1

Figure 6:
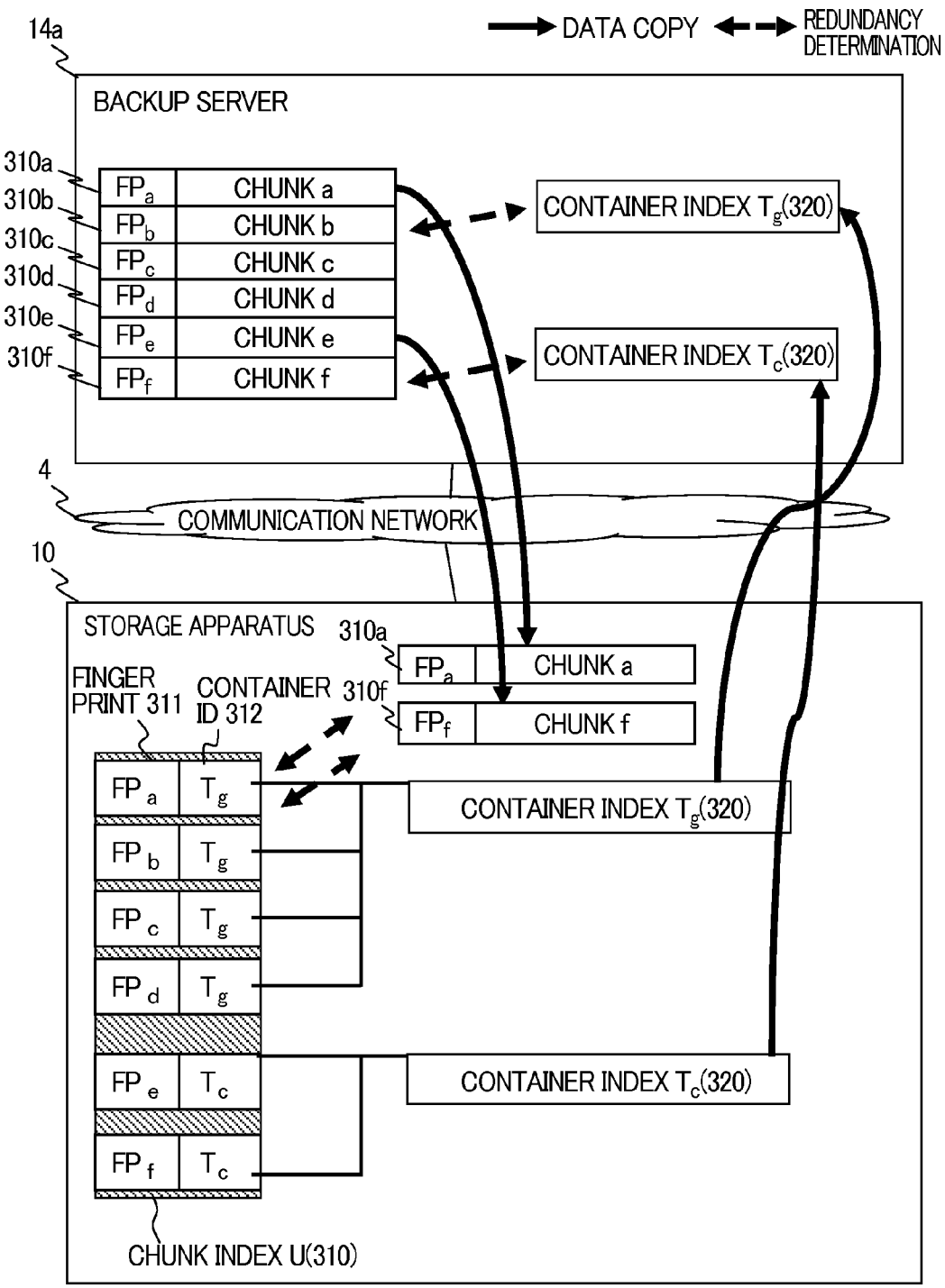
FIG. 6 is a diagram explaining a concept of backup processing according to the first embodiment.

Next, description is provided for an outline of de-duplication implemented by the storage system 1 in this embodiment. FIG. 6 schematically illustrates the outline of the de-duplication implemented by the storage system 1 in this embodiment. Here, although FIG. 6 illustrates only the backup server 14a as the backup server 14 provided to the storage system 1, multiple backup servers 14 (14a, 14b, . . . , 14n) are coupled to the storage apparatus 10 through the communication network 4 as in the case of FIG. 1.

As illustrated in FIG. 6, a backup target content includes a chunk a, a chunk b, a chunk c, a chunk d, a chunk e, and a chunk f. In addition, the storage apparatus 10 stores the chunk index U(310) and the container indexes Tg(320) and Tc(320).

Here, let us consider the case where the backup server 14a executes the first backup processing and no container index 320 is stored in the memory 103 or the HDD 104 in the backup server 14a.

Firstly, the backup program 106 of the backup server 14a makes the redundancy determination on the first chunk a. Since neither the memory 103 nor the HDD 104 stores the container index 320, the backup program 106 determines that the chunk a is a new chunk, and sends the chunk a and the finger print FPa of the chunk a to the storage apparatus 10.

The backup program 116 of the storage apparatus 10 makes the redundancy determination on the received chunk a by using the chunk index U(310). Before this process, if the container index 320 is already expanded on the memory 113 of the storage apparatus 10, the backup program 116 may reference to and search the container index 320 to find out whether or not the chunk a is stored redundantly. In reference to the chunk index U(310), the backup program 116 determines that the chunk a is already stored in the container Tg(380), hence processes the chunk a as a redundant chunk and sends the container index Tg(320) to the backup server 14a.

The backup program 106 of the backup server 14a expands the received container index Tg(320) on the memory 103, and uses the container index Tg(320) in the determination processing for the following chunks to be subjected to the backup processing. Since the container index Tg(320) stores the finger prints FPb, FPc, and FPd of the chunk b, the chunk c, and the chunk d, respectively, the backup program 106 determines that the chunk b, the chunk c, and the chunk d are redundant chunks.

However, since the finger print FPe of the chunk e is not registered in the container index Tg(320), the backup program 106 determines that the chunk e is a new chunk and sends the chunk e and the finger print FPe thereof to the storage apparatus 10.

The backup program 116 of the storage apparatus 10 makes the redundancy determination on the chunk e as is the case with the chunk a and sends the relevant container index Tc (320) to the backup server 14a.

The backup program 106 of the backup server 14a performs the redundancy determination processing on the following chunk f by using both of the received container index Tc(320) and the container index Tg(320) already expanded on the memory 103.

Since the chunks are gathered in each container in consideration of the locality of data as described above, there is a high possibility that the container Tg(380) storing the chunk a may store the following chunk b, chunk c, and chunk d, and therefore efficient de-duplication can be performed.

Here, when the backup program 106 of the backup server 14 performs the redundancy determination processing, the backup program 106 references to the finger prints 321 of at least one container index 320 except for the case where neither the memory 103 nor the HDD 104 stores the container index 320. To this end, the backup program 106 needs to expand the container indexes 320 on the memory 103. However, the capacity of the memory 103 is limited, the memory 103 has difficulty in leaving all the container indexes 320 for use by the backup program 106 always expanded on the memory 103. For this reason, the backup server 14 makes an effective utilization of the memory 103 by rolling in the container index 320 from the HDD 104 to the memory 103, and by rolling out the container index 320 from the memory 103 to the HDD 104. Here, the rolled-out container index 320 may be deleted from the HDD 104. In addition, in the redundancy determination by the backup program 116 in the storage apparatus 10, the roll-in and roll-out processing is similarly performed on the memory 113 and the HDD 114 of the storage apparatus 10.

In this embodiment, the backup program 106 of the backup server 14 and the backup program 116 of the storage apparatus 10 make the redundancy determination by comparing the fingerprints 321 of the chunks with each other, but instead may make the redundancy determination by comparing the chunks themselves with each other on a bit-by-bit basis in order to enhance the reliability of the redundancy determination. In this case, the backup program 116 of the storage apparatus 10 sends the backup server 14 the main body of the container 380 including the target chunk.

Detailed Operation of Backup Processing in this Embodiment

Figure 7:
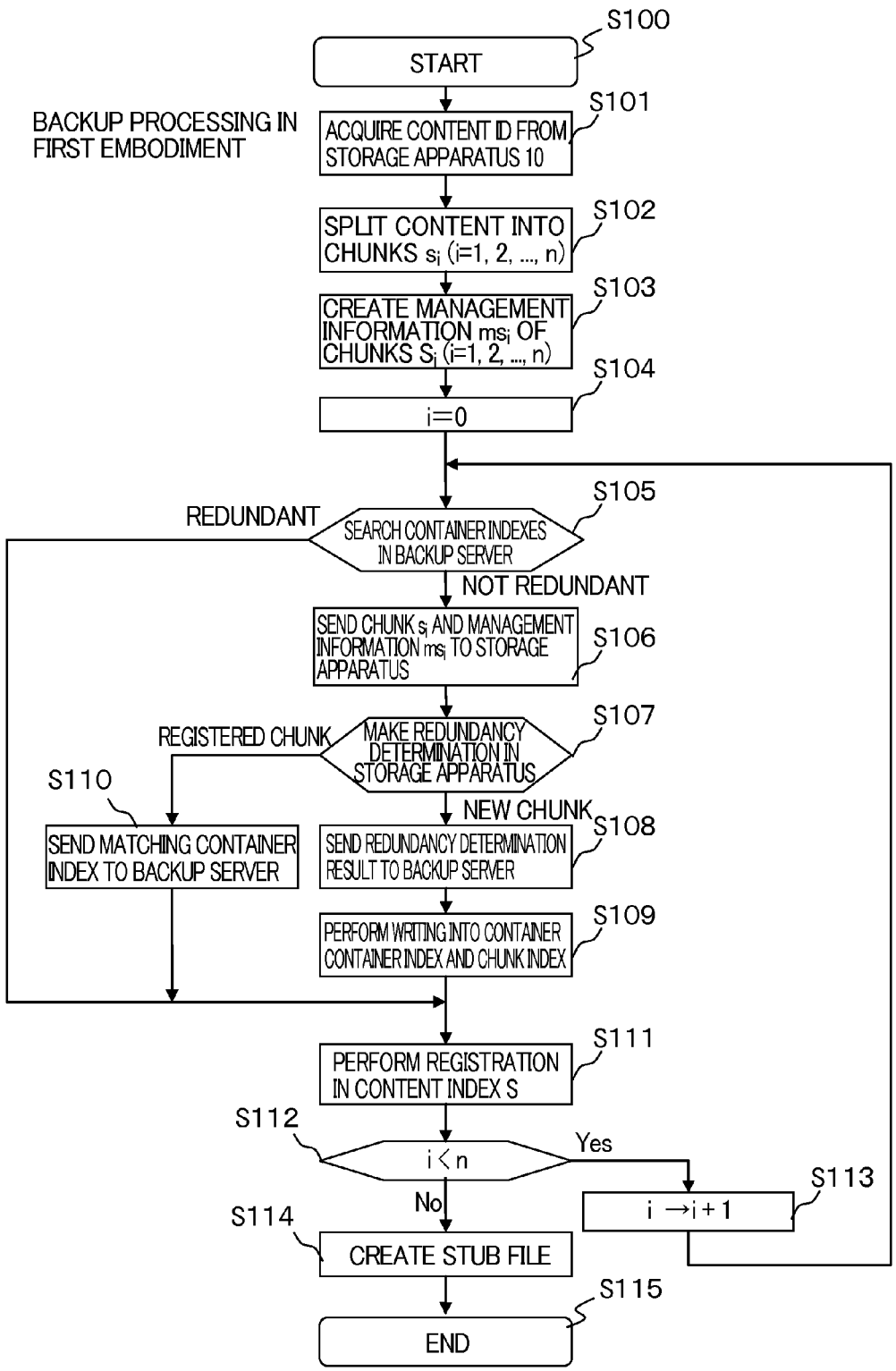
FIG. 7 is a flowchart illustrating an example of a processing procedure in the backup processing according to the first embodiment.

Next, description is provided for the backup processing executed by the storage system 1 in this embodiment. FIG. 7 illustrates a processing flow example of a backup processing operation executed by the backup program 106 of the backup server 14 and the backup program 116 of the storage apparatus 10 included in the storage system 1. Here, a letter S attached to each processing step in the processing flow example in FIG. 7 is an abbreviation for step.

To begin with, the backup program 106 of the backup server 14 starts the backup processing in response to an instruction or the like from the client 6 (S100) and acquires the content ID 371 for identifying a backup target content from the storage apparatus 10 (S101). This step is provided because the content ID 371 is managed in the content index 370 by the backup program 116 of the storage apparatus 10. Subsequently, the backup program 106 of the backup server 14 splits the backup target content into chunks $s_i$ (i=1, 2, . . . , n) (S102).

Then, the backup program 106 creates management information $ms_i$ (i=1, 2, . . . , n) of the chunks $s_i$ (S103). The management information $ms_i$ of each chunk includes the finger print 321 of the chunk, the intra-content location (content offset) 374 of the chunk, and the chunk length 323.

After that, the backup program 106 initializes a counter i (i=0) used for loop processing, and starts the redundancy determination of chunks $s_i$ to be described below (S104).

The backup program 106 searches the container indexes 320 expanded on the memory 103, and makes the redundancy determination on each chunk (S105). Specifically, the backup program 106 determines whether or not the container indexes 320 includes the finger print 321 matching the finger print of each of chunks split in S102. The backup program 106 determines that a determination target chunk is "redundant" if the finger print of the determination target chunk matches one of the finger prints 321 in the container indexes 320 or determines that the chunk is "not redundant" if the finger print of the chunk does not match.

When determining that the chunk $s_i$ having the matching finger print 321 is found in the container indexes 320 (i.e., determining "redundant") in S105, the backup program 106 performs processing in S111. On the other hand, when determining that the chunk $s_i$ having the matching finger print 321 is not found in the container indexes 320 (i.e., determining "not redundant") in S105, the backup program 106 performs processing in S106.

In S106, the backup program 106 sends the chunk $s_i$ and the management information $ms_i$ of the chunk $s_i$ to the storage apparatus 10.

Next, in S107, the backup program 116 of the storage apparatus 10 performs the redundancy determination of the chunk $s_i$ received from the backup server 14. When determining that the chunk $s_i$ is a new chunk in S107, the backup program 116 performs processing in S108.

In S108, the backup program 116 of the storage apparatus 10 sends the redundancy determination result in S107 to the backup server 14.

Subsequently, the backup program 116 of the storage apparatus 10 writes the chunk $s_i$ into the container 380, writes the management information $ms_i$ of the chunk $s_i$ into the container index 320, writes the message digest (hash value) of the chunk $s_i$ into the chunk index 310 (S109), and then performs processing in S111.

On the other hand, when determining that the chunk $s_i$ is "redundant" in S107, the backup program 116 of the storage apparatus 10 sends the backup server 14 the container index 320 including the finger print 321 matching the finger print of the chunk $s_i$ received from the backup server 14 (S110), and performs processing in S111. Here, the backup program 106 of the backup server 14 is configured to recognize a reception of the container index 320 from the storage apparatus 10 as a reception of the determination result of "redundant."

In S111, the backup program 116 of the storage apparatus 10 creates the content index 370, illustrated in FIG. 5, for the backup target content and registers the management information $ms_i$ on the chunks therein in order to use them in the restore processing.

Thereafter, the backup program 106 of the backup server 14 determines whether or not the redundancy determination processing and the registration processing in the content index 370 are completed for all the chunks (S112). Specifically, the backup program 106 of the backup server 14 compares the number n of chunks included in the backup target content with the count number of the counter i.

When determining that the redundancy determination processing and the registration processing in the content index are completed for all the chunks in S112 (S112, No), the backup program 106 of the backup server 14 creates a stub file for restore (S114), and terminates the backup processing of the target content (S115). The stub file stores the content ID 371 for searching for the content index 370 of a restore target during execution of the restore processing.

On the other hand, when determining that the redundancy determination processing and the registration processing in the content index are not completed yet for all the chunks in S112 (S112, Yes), the backup program 106 of the backup server 14 adds one to the counter i, and returns the processing to S105 (S113).

In the processing flow example in FIG. 7, after all the chunks are obtained by splitting the content and the management information on all the chunks is created in S102 and S103, the de-duplication of each chunk is performed in S104 and following steps. Instead, every time a chunk is split from the content, the management information creation and the de-duplication may be sequentially preformed for the split chunk. This produces a state where the information necessary for the processing after the chunk split (the management information creation and the de-duplication) is always expanded on the memory 103, and thereby leads to effective use of the memory 103 and improvement in the processing performance of the de-duplication.

In addition, in the processing flow example in FIG. 7, when determining that the chunk $s_i$ is "not redundant" in S105, the backup program 106 of the backup server 14 waits for the storage apparatus 10 to terminate the de-duplication, acquires a result of the de-duplication, and then starts the processing for the next chunk $s_{i+1}$. Instead, immediately after sending the chunk $s_i$ and the management information $ms_i$ of the chunk $s_i$ to the storage apparatus 10 in S106, the backup program 106 may start the processing for the next chunk $s_{i+1}$. In this case, there is a possibility that multiple chunks registered in the same container index 320 will be sent to the storage apparatus 10. For this reason, the storage apparatus 10 is configured to memorize which of the backup servers 14 (14a, 14b, . . . , 14n) the container index 320 expanded on the memory 113 is already sent to, and not to send the same container index 320 as the already sent one to each backup server 14.

For example, let us consider a case where the chunk $s_i$ and the chunk $s_{i+1}$ are registered in the same container index 320 and the backup server 14a does not acquire the container index 320 yet. In this case, the backup program 106 of the backup server 14a determines that the chunk $s_i$ is "not redundant" and sends the chunk $s_i$ and the management information $ms_i$ to the storage apparatus 10. Then, before receiving the redundancy determination result of the chunk $s_i$ from the storage apparatus 10, the backup program 106 makes the redundancy determination on the chunk $s_{i+1}$, hence determines that the chunk $s_{i+1}$ is "not redundant" and sends the chunk $s_{i+1}$ and the management information $ms_{i+1}$ to the storage apparatus 10. Meanwhile, the backup program 116 of the storage apparatus 10 performs the redundancy determination on the chunk $s_i$, and sends the relevant container index 320 to the backup server 14a. In this process, the backup program 116 stores in the memory 113 information that the relevant container index 320 is already sent to the backup server 14a. With this configuration, in the redundancy determination on the chunk $s_{i+1}$, the backup program 116 determines that the relevant container index 320 is already sent to the backup server 14a before sending the relevant container index 320, and does not send the relevant container index 320.

As described above, the backup program 106 of the backup server 14 and the backup program 116 of the storage apparatus 10 operate in collaboration with each other, whereby the processing performance of the de-duplication in the storage system 1 can be improved.

Detailed Operation of Restore Processing in this Embodiment

Figure 8:
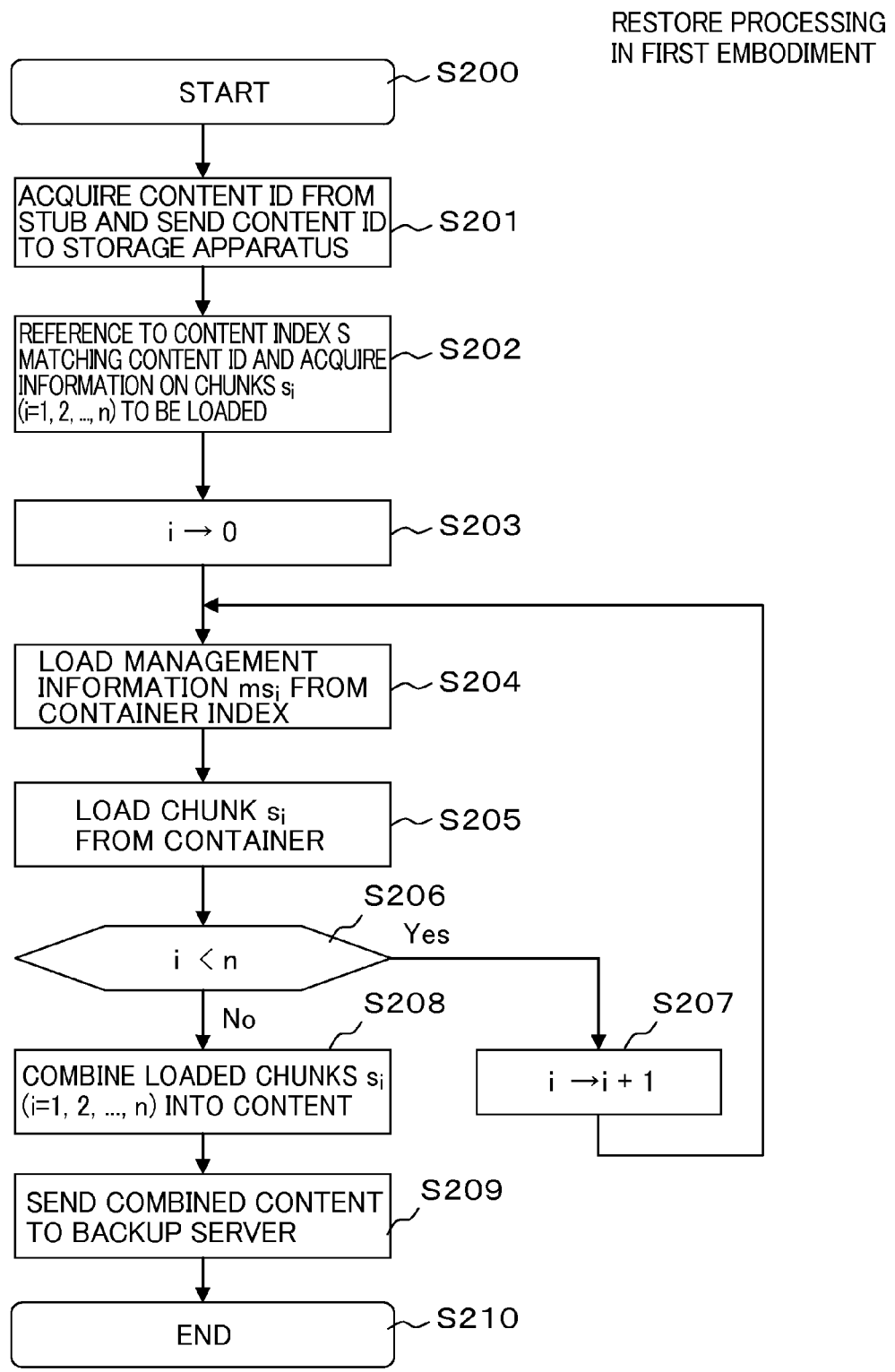
FIG. 8 is a flowchart illustrating an example of a processing procedure in the restore processing according to the first embodiment.

Next, description is provided for the restore processing executed by the storage system 1 in this embodiment. FIG. 8 illustrates a processing flow example of the restore processing executed by the restore program 107 of the backup server 14 and the restore program 117 of the storage apparatus 10.

The restore program 107 of the backup server 14 starts the restore processing in response to a content restore instruction or the like from the client 6 (S200), then firstly acquires the relevant content ID of a restore target content from the stub files stored in the HDD 104 and sends the content ID to the storage apparatus 10 (S201).

The restore program 117 of the storage apparatus 10 references to the content index 370, and acquires information on chunks $s_i$ ($s_i$=1, 2, . . . , n) included in the content to be loaded (S202). Specifically, the restore program 117 creates a list of to-be-loaded chunks $s_i$ from the content index 370.

Then, the restore program 117 of the storage apparatus 10 sets 0 in a counter i for counting chunks necessary for the restore processing (S203). After that, the restore program 117 loads the management information $ms_i$ of the container index 320 (S204). To be more specific, the restore program 117 loads the container index 320 to which each of the chunks $s_i$ belongs from the HDD 114 by using the information on the chunks $s_i$ of the content index 370 acquired in S202. The management information $ms_i$ of the chunk $s_i$ includes the finger print 321 of the chunk, the intra-container location (container offset) 322 and the chunk length 323, as described above.

Thereafter, the restore program 117 of the storage apparatus 10 loads the chunks $s_i$ from the containers 380 corresponding to the container indexes 320 on the basis of the management information $ms_i$ of the chunks $s_i$ loaded in S204 (S205).

Then, the restore program 117 of the storage apparatus 10 determines whether or not loading of all the chunks in the restore target content is completed (S206). Specifically, the restore program 117 compares the number n of chunks included in the restore target content with the count number of the counter i.

When determining that the loading of all the chunks is completed in S206 (S206, No), the restore program 117 of the storage apparatus 10 reproduces the content by using the loaded chunks $s_i$ (i=1, 2, . . . , n) (S208), sends the reproduced content to the backup server 14 (S209), and then terminates the restore processing (S210). To be more specific, the restore program 117 recombines the loaded chunks $s_i$ into the content on the basis of the content offset 374 and the chunk length 375 written in the content index 370. On the other hand, when determining that the loading of all the chunks is not completed in S206 (S206, Yes), the restore program 117 of the storage apparatus 10 adds one to the counter i and returns the processing to S204 (S207).

The storage system 1 in this embodiment achieves efficient de-duplication in such a way that the backup server 14 acquires the container indexes 320 to be used in the de-duplication from the storage apparatus 10 when needed.

The backup server 14 performs de-duplication and sends only new chunks to the storage apparatus 10, whereby the data volume sent to the storage apparatus 10 can be reduced. The reduction of the data volume sent to the storage apparatus 10 can make the load of the communication network 4 reduced.

Moreover, since that the backup server 14 acquires the container indexes 320 to be used in the de-duplication by the backup server 14 from the storage apparatus 10 when necessary, the storage capacity used for the de-duplication by the backup server 14 can be reduced.

In addition, since the container index 320 acquired from the storage apparatus 10 is created in consideration of the locality of data, the possibility that the container index 320 may include information on the following chunks to be subjected to the de-duplication is high, so that effective use of the memory 104 of the backup server 14 can be achieved.

Additionally, since the size of the container index 320 is smaller than the total size of all the chunks stored in the storage apparatus 10, the redundancy determination can be made at high speed.

Second Embodiment

Hereinafter, description is provided for a storage system 1 according to a second embodiment of the present invention.

Configuration of Storage System 1 of Second Embodiment

Figure 9:
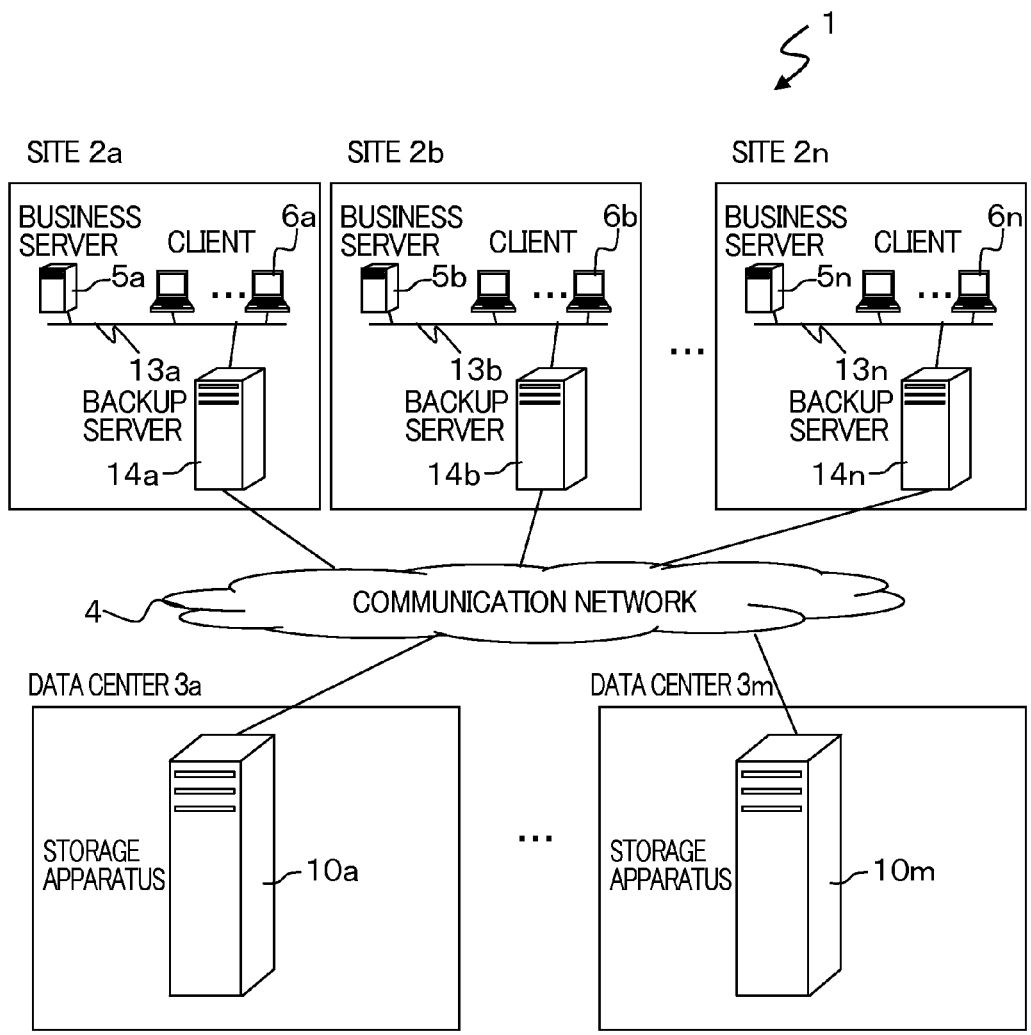
FIG. 9 is a diagram illustrating an overall configuration of a storage system 1 according to a second embodiment of the present invention.

FIG. 9 illustrates an overall configuration example of the storage system 1 in this embodiment. The configuration of the second embodiment illustrated in FIG. 9 is the same as in the first embodiment illustrated in FIG. 1 except for a point where the storage system 1 includes multiple data centers 3 (3a, 3b, . . . , 3m) provided with storage apparatuses 10 (10a, 10b, . . . , 10m), respectively. For this reason, the detailed description on the configuration of the storage system 1 is omitted herein.

Backup Processing and Restore Processing

Next, description is provided for backup processing and restore processing executed by the storage system 1 in the second embodiment.

Detailed Operation of Backup Processing

Figure 10:
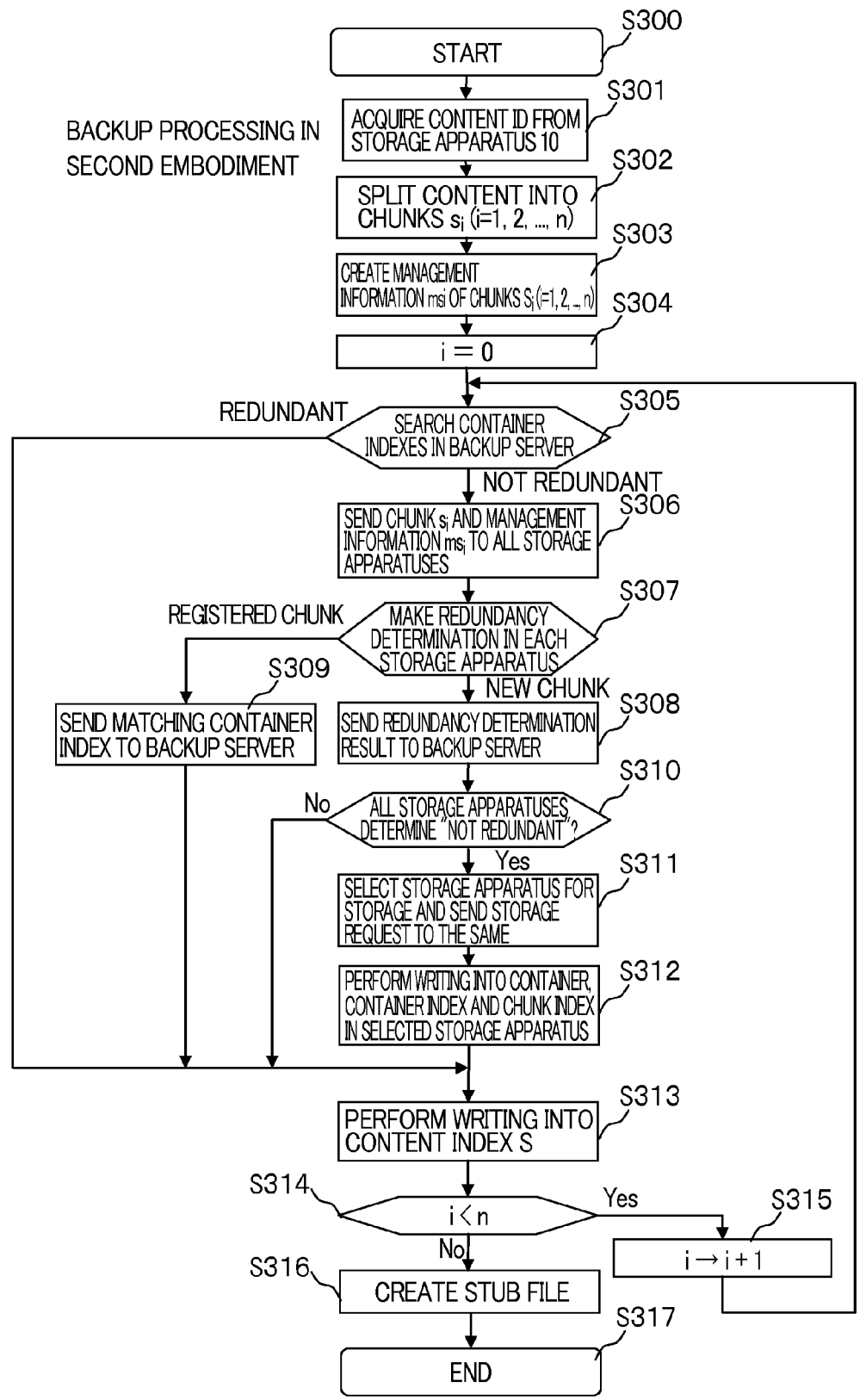
FIG. 10 is a flowchart illustrating an example of a processing procedure in backup processing according to the second embodiment.

Firstly, the backup processing executed by the storage system 1 in this embodiment is explained. FIG. 10 illustrates a processing flow example of the backup processing in this embodiment.

Since processing in S300 to S304 is the same as the processing in S100 to S104 in the processing flow example of the first embodiment illustrated in FIG. 7, the detailed explanation thereof is omitted herein.

When determining that the chunk $s_i$ having the finger print matching the finger print of the processing target chunk is found in the container indexes 320 (i.e., determining "redundant") in S305, the backup program 106 of the backup server 14 performs processing in S313. On the other hand, when determining that the chunk $s_i$ having the matching finger print is not found in the container indexes 320 (i.e., determining "not redundant") in S305, the backup program 106 of the backup server 14 performs processing in S306.

In S306, the backup program 106 of the backup server 14 sends the chunk $s_i$ and the management information $ms_i$ of the chunk $s_i$ to all the storage apparatuses 10 (10a, 10b, . . . , 10m) coupled to the storage system 1.

In S307, the backup program 116 of each of the storage apparatuses 10 performs the redundancy determination on the chunk $s_i$ received from the backup server 14. When determining that the chunk $s_i$ is a new chunk in S307, the backup program 116 of the storage apparatus 10 performs processing in S308.

In S308, the backup program 116 of the storage apparatus 10 sends the redundancy determination result "not redundant" to the backup server 14.

On the other hand, when determining that the chunk $s_i$ is "redundant" in S307, the backup program 116 of the storage apparatus 10 performs processing in S309.

The backup program 116 of the storage apparatus 10 sends the container index 320 including the finger print 321 matching the finger print of the received chunk $s_i$ in S309, and then performs processing in S313

When the determination results of all the storage apparatuses 10 are "not redundant" in S310 (S310, Yes), the backup program 106 of the backup server 14 performs processing in S311. Here, the backup program 106 of the backup server 14 is configured to recognize a reception of the container index 320 from any of the storage apparatuses 10 as a reception of the determination result of "redundant."

In S311, the backup program 106 of the backup server 14 selects the storage apparatus 10 where to store the chunk $s_i$, and sends a storage request for the chunk $s_i$. At this time, since the chunk $s_i$ is already sent in S305, the chunk $s_i$ is not sent. The storage apparatus 10 where to store the chunk $s_i$ can be selected in any appropriate method.

The storage apparatus 10 selected in S311 writes the chunk $s_i$ into the container 380, registers the management information $ms_i$ of the chunk $s_i$ in the container index 320, also registers the message digest of the chunk $s_i$ in the chunk index 310 (S312), and then performs the processing in S313.

In S313, the backup program 116 of the storage apparatus 10 creates the content index 370, illustrated in FIG. 5, for the backup target content and registers the management information $ms_i$ on the chunks therein in order to use them in the restore processing.

Thereafter, the backup program 106 of the backup server 14 determines whether or not the redundancy determination processing and the registration processing are completed for all the chunks (S314). Specifically, the backup program 106 of the backup server 14 compares the number n of chunks included in the processing target content with the count number of the counter i.

When determining that the redundancy determination processing and the registration processing are completed for all the chunks in S314 (S314, No), the backup program 106 of the backup server 14 creates a stub file for restore processing (S316), and terminates the backup processing of the target content (S317). The stub file stores the content ID 371 for searching for the content index 370 of a restore target during the execution of the restore processing.

On the other hand, when determining that the redundancy determination processing and the registration processing are not completed yet for all the chunks in S313 (S313, Yes), the backup program 106 of the backup server 14 adds one to the counter i, and returns the processing to S304 (S314).

Here, the restore processing according to this embodiment is substantially the same as in the first embodiment, except for a point where the backup server 14 having received an instruction to execute the restore processing sends the content ID 371 of a restore target content to the multiple storage apparatuses 10, and therefore the detailed description is omitted herein.

As described above, in this embodiment, the efficient de-duplication is similarly applicable to multiple storage apparatuses 10 as is the case with the first embodiment.

In addition, in the processing flow example of FIG. 10, only a single chunk is sent to the storage apparatuses 10 in S306, but multiple chunks may be sent collectively. For example, 10 chunks among chunks determined as new chunks may be collectively sent to the storage apparatuses 10. This way of processing leads to speed-up of the de-duplication in some cases.

Third Embodiment

Figure 11:
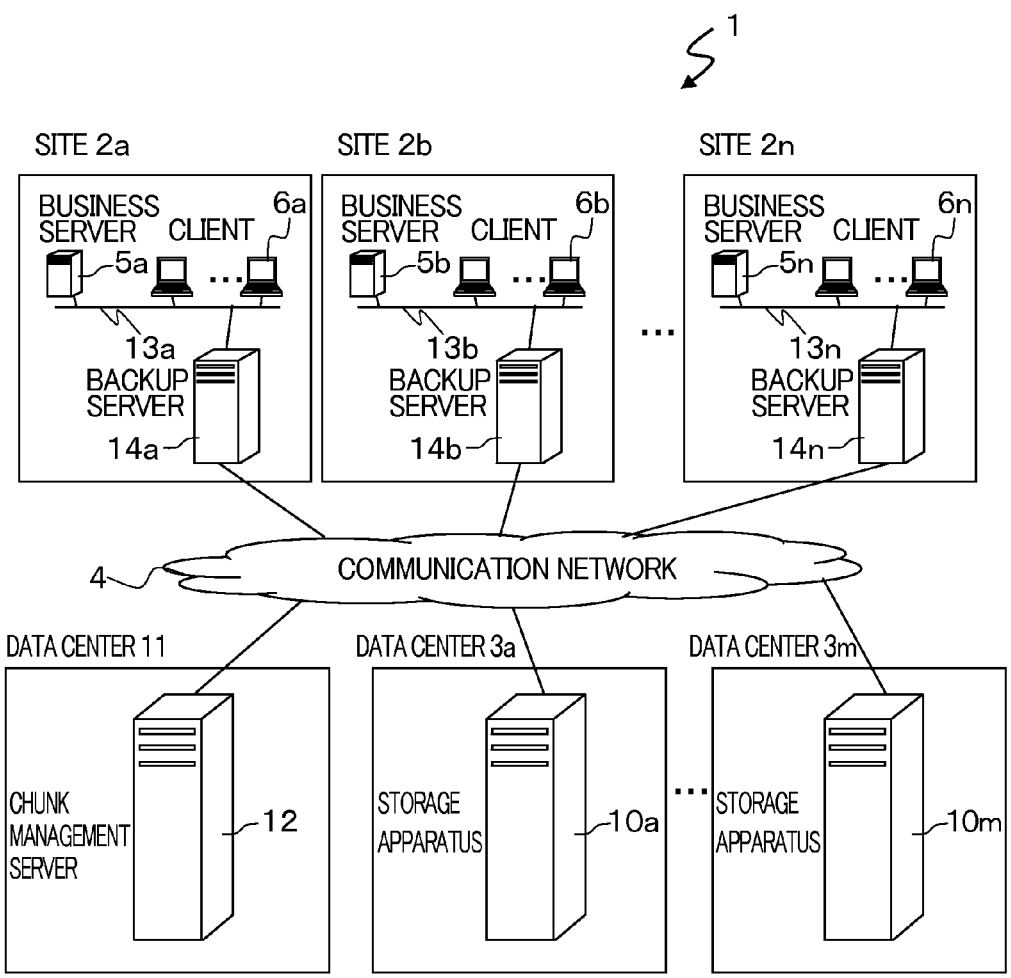
FIG. 11 is a diagram illustrating an overall configuration of a storage system 1 according to a third embodiment of the present invention.

Hereinafter, description is provided for a storage system 1 according to a third embodiment of the present invention.
Configuration of Storage System 1 in Third Embodiment FIG. 11 illustrates an overall configuration example of the storage system 1 in this embodiment. The overall configuration of the storage system 1 in this embodiment is the same as in the second embodiment except for a point where the storage system 1 includes a data center 11 and a chunk management server 12 provided to the data center 11. For this reason, the detailed description of the same configuration of the storage system 1 as in the second embodiment is omitted herein.

The chunk management server 12 manages the chunk indexes 310, the container indexes 320, and the content indexes 370 stored in all the data centers 3 ($3a$, $3b$, ..., $3m$) provided in the storage system 1.

Figure 12:
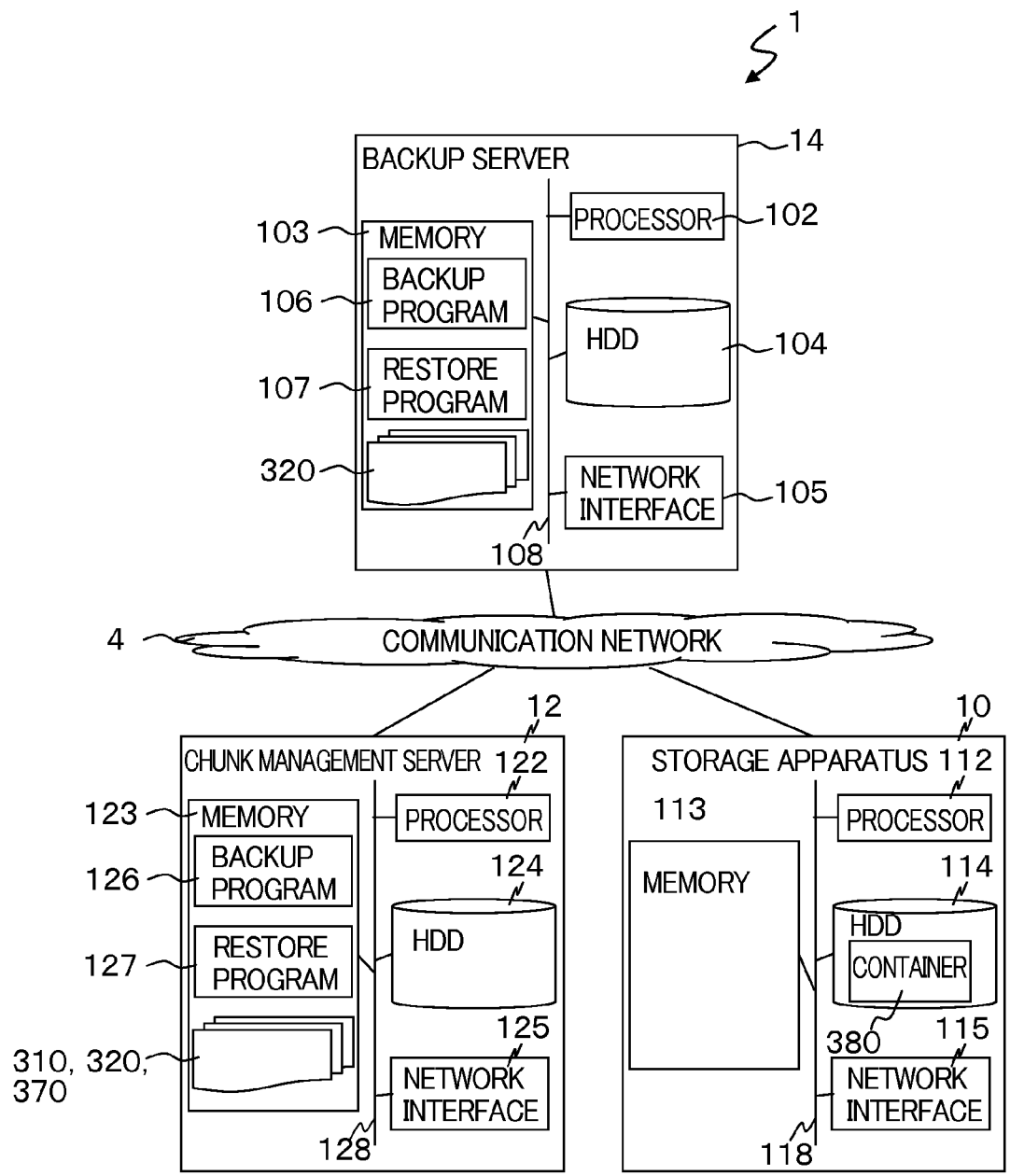
FIG. 12 is a block diagram illustrating configurations of a backup server and a storage apparatus according to the third embodiment.

FIG. 12 illustrates a block diagram of configuration examples of the backup server 14 provided in the site 2 of the storage system 1 illustrated in FIG. 11, the storage apparatus 10 provided in the data center 3, and the chunk management server 12 provided in the data center 11.

The configuration of the backup server 14 in this embodiment is the same as the configuration of the backup server 14 in the first embodiment, and the detailed description thereof is omitted herein. In addition, the configuration of the storage apparatus 10 in this embodiment is the same as in the storage apparatus 10 of the first embodiment except for a point where the backup program 116 and the restore program 117 are removed, and therefore the detailed description thereof is omitted herein. The functions of the backup program 116 and the restore program 117 in the first embodiment are performed by a backup program 126 and a restore program 127 installed in the chunk management server 12.

Figure 13:
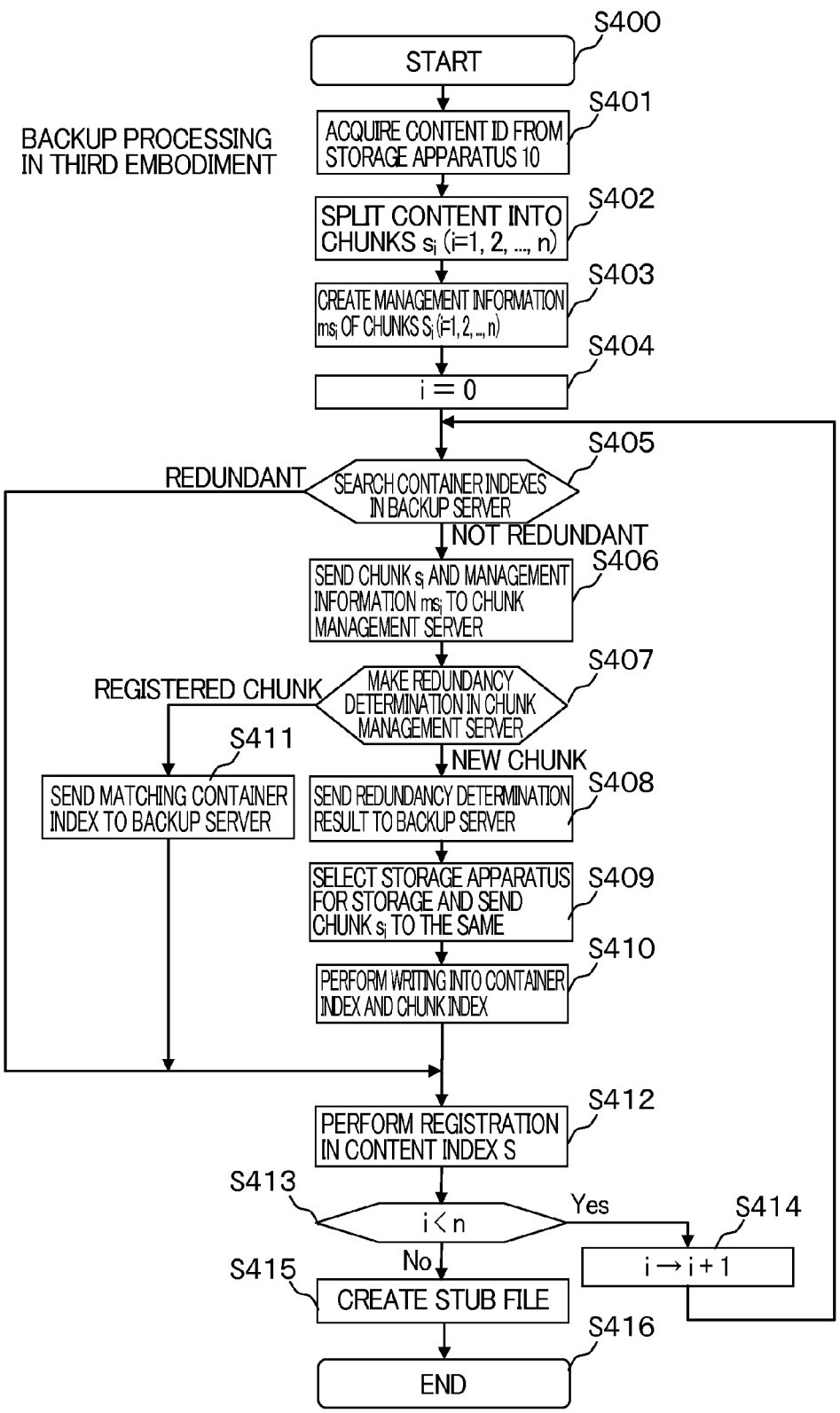
FIG. 13 is a flowchart illustrating an example of a processing procedure in backup processing according to the third embodiment.

The configuration of the chunk management server 12 in this embodiment is substantially the same as the configuration of the storage apparatus 10 in the first embodiment, and therefore the detailed description thereof is omitted herein.
Backup Processing and Restore Processing in Storage System 1 in Third Embodiment Next, description is provided for the backup processing and the restore processing executed by the storage system 1 in this embodiment.
Detailed Operation of Backup Processing To begin with, the backup processing executed by the storage system 1 in this embodiment is described. FIG. 13 illustrates a processing flow example of a backup processing operation according to this embodiment. The backup processing illustrated in FIG. 13 is executed by the backup program 106 of the backup server 14 and the backup program 126 of the chunk management server 12.

The backup program 106 of the backup server 14 receives an instruction to execute the backup processing from the client 6 or the like, and then starts the backup processing in this embodiment (S400). The processing in S401 to S404 executed thereafter is the same as the processing in S101 to S104 in the first embodiment, and therefore the detailed description thereof is omitted herein.

When determining that the chunk $s_i$ having the finger print 321 matching the finger print of the processing target chunk is found in the container indexes 320 in the backup server 14 (i.e., determining "redundant") in S405, the backup program 106 of the backup server 14 performs processing in S412. On the other hand, when determining that the chunk $s_i$ having the matching finger print is not found in the container indexes 320 in the backup server 14 (i.e., determining "not redundant") in S405, the backup program 106 of the backup server 14 performs processing in S406. In S406, the backup program 106 of the backup server 14 sends the chunk $s_i$ and the management information $ms_i$ of the chunk $s_i$ to the chunk management server 12.

In S407, the backup program 126 of the chunk management server 12 makes the redundancy determination on the chunk $s_i$ received from the backup server 14. When determining that the chunk $s_i$ is a new chunk in S407, the backup program 126 of the chunk management server 12 performs processing in S408.

In S408, the backup program 126 of the chunk management server 12 performs processing in S409 by sending the redundancy determination result to the backup server 14.

In S409, the backup program 126 of the chunk management server 12 selects one of the storage apparatuses 10 ($10a$, $10b$, ..., $10m$) where to store the new chunk received from the backup server 14, and registers the chunk $s_i$ in a container of the selected storage apparatus 10. The storage apparatus 10 where to store the new chunk can be selected in any appropriate method.

In S411, the backup program 126 of the chunk management server 12 registers the management information $ms_i$ of the chunk $s_i$ in the container index 320 and records the message digest of the chunk $s_i$ in the chunk index 310, and then performs the processing in S412.

On the other hand, when determining that the chunk $s_i$ is "redundant" in S407, the backup program 126 of the chunk management server 12 sends the backup server 14 the container index 320 including the finger print 321 matching the finger print of the received chunk $s_i$ (S411), and then performs the processing in S412.

In S412, the backup program 126 of the chunk management server 12 creates the content index 370, illustrated in FIG. 5, for the backup target content and registers the management information $ms_i$ on the chunks therein in order to use them in the restore processing.

Thereafter, the backup program 106 of the backup server 14 determines whether or not the redundancy determination processing and the writing processing are completed for all the chunks (S413). Specifically, the backup program 106 of the backup server 14 compares the number n of chunks included in the backup target content with the count number of the counter i.

When determining that the redundancy determination processing and the registration processing in the chunk index table and the content index are completed for all the chunks (S413, No), the backup program 106 of the backup server 14 creates a stub file for restore processing (S415), and terminates the backup processing of the target content (S416). The stub file stores the content ID 371 for searching for the content index 370 of a restore target during execution of the restore processing.

On the other hand, when determining that the redundancy determination processing and the registration processing in the chunk index and the content index are not completed for all the chunks in S413 (S413, Yes), the backup program 106 of the backup server 14 adds one to the counter i, and returns the processing to S404 (S414).

Although FIG. 11 illustrates only one chunk management server 12, multiple chunk management servers 12 may be provided. With this configuration, inquiries, which otherwise would be concentrated in a single chunk management server 12, can be distributed among the chunk management servers 12 and thereby the speed-up of the de-duplication can be achieved in some cases. For example, the chunk management servers 12 are assigned the chunk indexes to be managed, by using partial information of the finger prints of the chunk indexes to be managed in the chunk management servers 12, for example. This assignment can be made by using the most significant X bits or least significant X bits of the finger print where X is a certain natural number, or by using a bit pattern extracted from the finger print according to a predetermined pattern.

When the chunk index is configured such that storage apparatus identification information and the container ID can be extracted from the chunk index by using the finger print in the chunk index as a key, the multiple chunk management servers 12 can implement the distributed processing.

Detailed Operation of Restore Processing

The restore processing according to this embodiment is substantially the same as in the first embodiment except for points where the client 6 or the like sends the chunk management server 12 a restore processing execution instruction specifying a content ID, and where the functions of the restore program 117 of the storage apparatus 10 in the first embodiment are implemented by the restore program 127 of the chunk management server 12, and therefore the detailed description thereof is omitted herein.

As described above, in the third embodiment, more efficient de-duplication can be performed for multiple storage apparatuses 10. In this embodiment, since the information necessary for the de-duplication is centralized in the chunk management server 12, chunks and the management information of the chunks need to be exchanged only between the backup servers 14 and the chunk management server 12, which leads to a reduction in the network load.

Fourth Embodiment

Next, description is provided for a storage system 1 according to a fourth embodiment of the present invention.

Configuration of Storage System 1 in Fourth Embodiment

An overall configuration of the storage system 1 in this embodiment is the same as the storage system 1 in the first embodiment illustrated in FIG. 1, and therefore the detailed description thereof is omitted herein.

Figure 14:
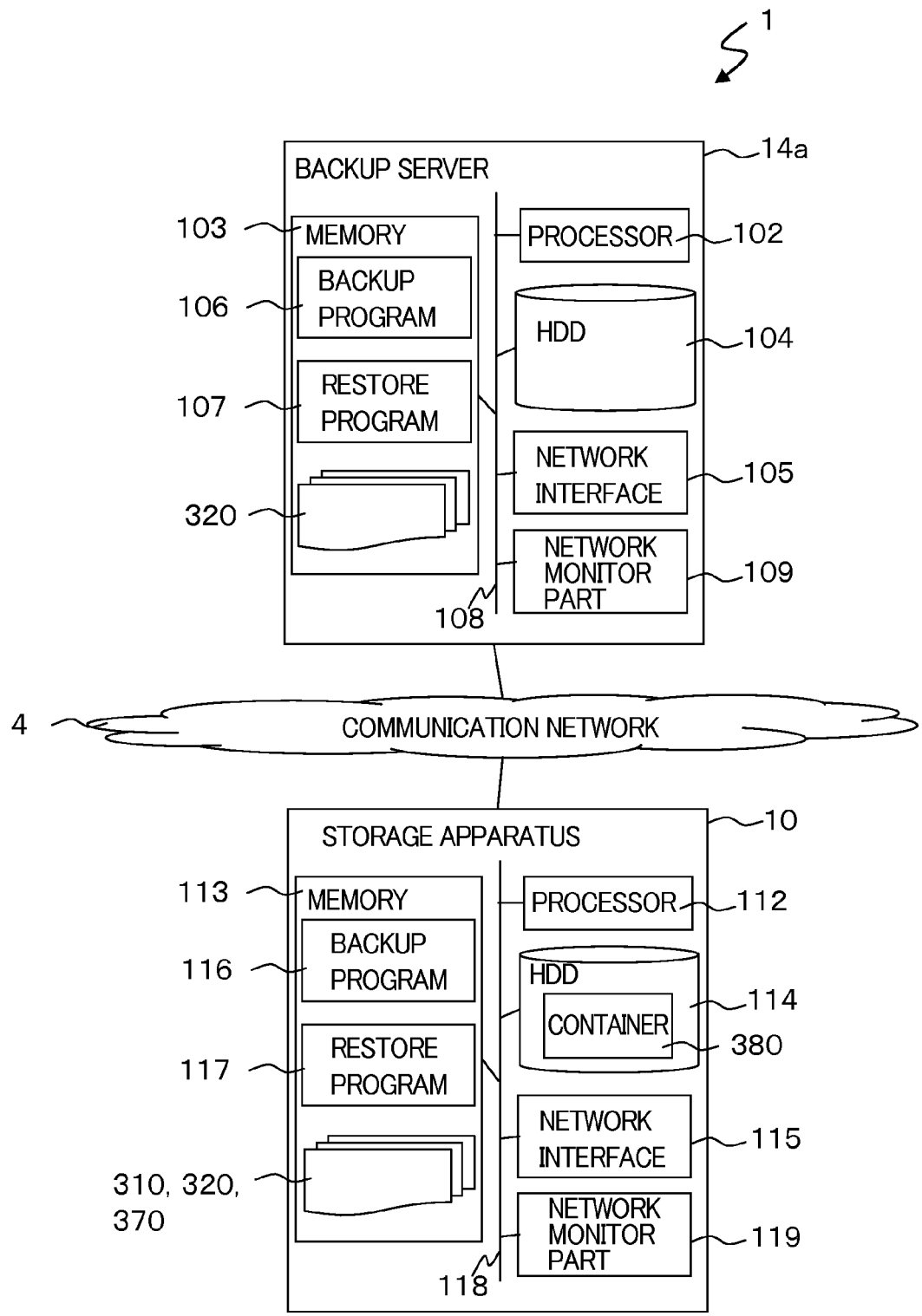
FIG. 14 is a diagram illustrating an overall configuration of a storage system 1 according to a fourth embodiment of the present invention.

FIG. 14 illustrates a block diagram of configuration examples of the backup server 14 installed in the site 2 and the data center 3 provided with the storage apparatus 10 in the storage system 1 according to this embodiment.

The backup server 14 has the same configuration as the backup server 14 in the first embodiment illustrated in FIG. 2, except for a network monitor part 109, and therefore the detailed description thereof is omitted herein. The network monitor part 109 is a functional block to monitor the data volume exchanged with the communication network 4 through the network interface 105, and can be configured by using any suitable hardware and software that can implement the function.

The storage apparatus 10 also has the same configuration as the storage apparatus 10 in the first embodiment illustrated in FIG. 2, except for a network monitor part 119, and therefore the detailed description thereof is omitted herein. The network monitor part 119 of the storage apparatus 10 has the same function as the network monitor part 109 of the backup server 14, and monitors the data volume exchanged with the communication network 4 through the network interface 115.

Use of the network monitor part 109 of the backup server 14 and the network monitor part 119 of the storage apparatus 10 enables measurement of a load on the communication network 4 through which the backup server 14 and the storage apparatus 10 are coupled to each other.

Backup Processing and Restore Processing of Storage System 1 in Fourth Embodiment Next, description is provided for the backup processing and the restore processing executed by the storage system 1 in this embodiment.

Detailed Operation of Backup Processing

Figure 15:
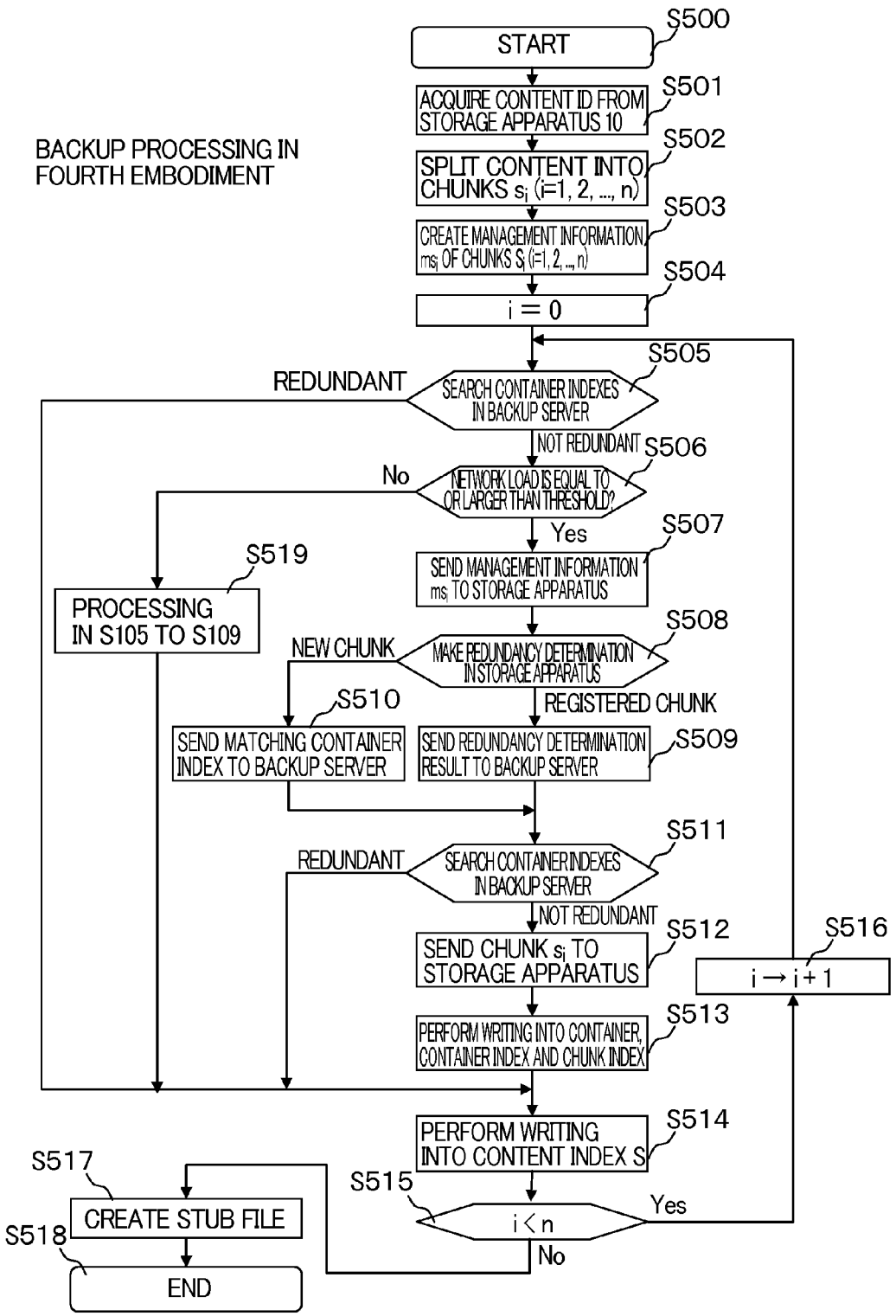
FIG. 15 is a flowchart illustrating an example of a processing procedure in backup processing according to the fourth embodiment.

Firstly, the backup processing executed by the storage system 1 in this embodiment is explained. FIG. 15 illustrates a processing flow example of a backup processing operation according to this embodiment. The backup processing illustrated in FIG. 15 is executed by the backup program 106 of the backup server 14 and the backup program 116 of the storage apparatus 10.

The backup program 106 of the backup server 14 receives an instruction to execute the backup processing from a client 6 or the like, and starts the backup processing in this embodiment (S500). The processing in S501 to S504 executed thereafter is the same as the processing in S101 to S104 in the first embodiment, and therefore the detailed description thereof is omitted herein.

When determining that the chunk $s_i$ having the finger print 321 matching the finger print of the processing target chunk is found in the container indexes 320 in the backup server 14 (i.e., determining "redundant") in S505, the backup program 106 of the backup server 14 performs processing in S514. On the other hand, when determining that the chunk $s_i$ having the finger print 321 matching the finger print of the processing target chunk is not found in the container indexes 320 in the backup server 14 (i.e., determining "not redundant") in S505, the backup program 106 of the backup server 14 performs processing in S506.

The backup program 106 of the backup server 14 measures the load on the communication network 4 by means of the network monitor part 109 in S506. When the load measurement value of the communication network 4 is equal to or larger than a preset threshold (S506, Yes), the backup program 106 performs processing in S507. Here, the threshold for the load measurement value of the communication network 4 can be determined in consideration of conditions such as performance of the communication network 4.

When determining that the load of the communication network 4 is lower than the threshold (S506, No), the backup program 106 of the backup server 14 and the backup program 116 of the storage apparatus 10 perform the same processing as the processing in S105 to S109 in FIG. 5 in the first embodiment. After the processing in S105 to S109, the backup program 116 of the storage apparatus 10 performs processing in S514.

In S507, the backup program 106 of the backup server 14 sends the management information $ms_i$ of the chunk $s_i$ to the storage apparatus 10.

In S508, the backup program 116 of the storage apparatus 10 makes the redundancy determination on the chunk $s_i$ by using the management information $ms_i$ of the chunk $s_i$ received from the backup server 14.

When determining that the chunk $s_i$ is a new chunk in S508, the backup program 116 of the storage apparatus 10 sends the redundancy determination result to the backup server 14 (S509).

On the other hand, when determining that the chunk $s_i$ is a redundant chunk in S508, the backup program 116 of the storage apparatus 10 sends the corresponding container index 320 to the backup server 14 (S510). Here, the backup program 106 of the backup server 14 is configured to recognize a reception of the container index 320 from the storage apparatus 10 as a reception of the determination result of "redundant."

In S511, the backup program 106 of the backup server 14 acquires the redundancy determination result from the storage apparatus 10, and performs the redundancy determination processing. Here, if the redundancy determination result received from the storage apparatus 10 is "redundant," the backup program 106 of the backup server 14 makes the redundancy determination in consideration of the container index 320 acquired in S510.

When determining that the result is "not redundant" in S511, the backup program 106 of the backup server 14 sends the processing target chunk $s_i$ to the storage apparatus 10 (S512). Here, the management information $ms_i$ of the chunk $s_i$ is already sent to the storage apparatus 10, and hence is not sent in S512.

Subsequently, in S513, the backup program 116 of the storage apparatus 10 registers the chunk $s_i$ acquired from the backup server 14 into the container 380, registers the management information $ms_i$ of the chunk $s_i$ into the container index 320, and records the message digest of the chunk $s_i$ into the chunk index 310. Then, the backup program 116 performs processing in S514.

On the other hand, when the determination result is "redundant" in S511, the backup program 116 of the storage apparatus 10 performs processing in S514.

In S514, the backup program 116 of the storage apparatus 10 creates the content index 370, illustrated in FIG. 5, for the backup target content and registers the management information $ms_i$ on the chunks therein in order to use them in the restore processing.

After that, the backup program 106 of the backup server 14 determines whether or not the redundancy determination processing and the registration processing in the chunk index and the content index are already completed for all the chunks included in the backup target content (S515). Specifically, the backup program 106 of the backup server 14 compares the number n of chunks included in the content with the count number of the counter i.

When determining that the redundancy determination processing and the registration processing in the chunk index and the content index are completed for all the chunks in S515 (S515, No), the backup program 106 of the backup server 14 creates a stub file for restore processing (S517), and terminates the backup processing of the target content (S518). The stub file stores the content ID 371 for searching for the content index 370 of a restore target during execution of the restore processing.

On the other hand, when determining that the redundancy determination processing and the registration processing in the chunk index and the content index are not completed yet for all the chunks included in the backup target content in S515 (S515, Yes), the backup program 106 of the backup server 14 adds one to the counter i, and returns the processing to S105 (S516).

Detailed Operation of Restore Processing

The restore processing in this embodiment is substantially the same as the restore processing in the first embodiment illustrated in FIG. 8, and therefore the detailed description thereof is omitted herein.

As described above, this embodiment enables de-duplication in consideration of a network load. In particular, under the condition where the communication network 4 in the storage system 1 has a large network load, more efficient de-duplication can be performed by reducing the traffic volume in the communication network 4 used by the de-duplication.

Fifth Embodiment

Next, description is provided for a storage system 1 according to a fifth embodiment of the present invention.

Configuration of Storage System 1 of Fifth Embodiment

An overall configuration of the storage system 1 in this embodiment is the same as in the first embodiment illustrated in FIG. 1, and therefore the detailed description thereof is omitted herein. In addition, the block configurations of the backup server 14 and the storage apparatus 10 are the same as those in the first embodiment illustrated in FIG. 3, and therefore the detailed description thereof is omitted herein.

Backup Processing and Restore Processing of Storage System 1 in Fifth Embodiment Next, description is provided for backup processing and restore processing executed in the storage system 1 of the fifth embodiment.

Detailed Operation of Backup Processing

Figure 16:
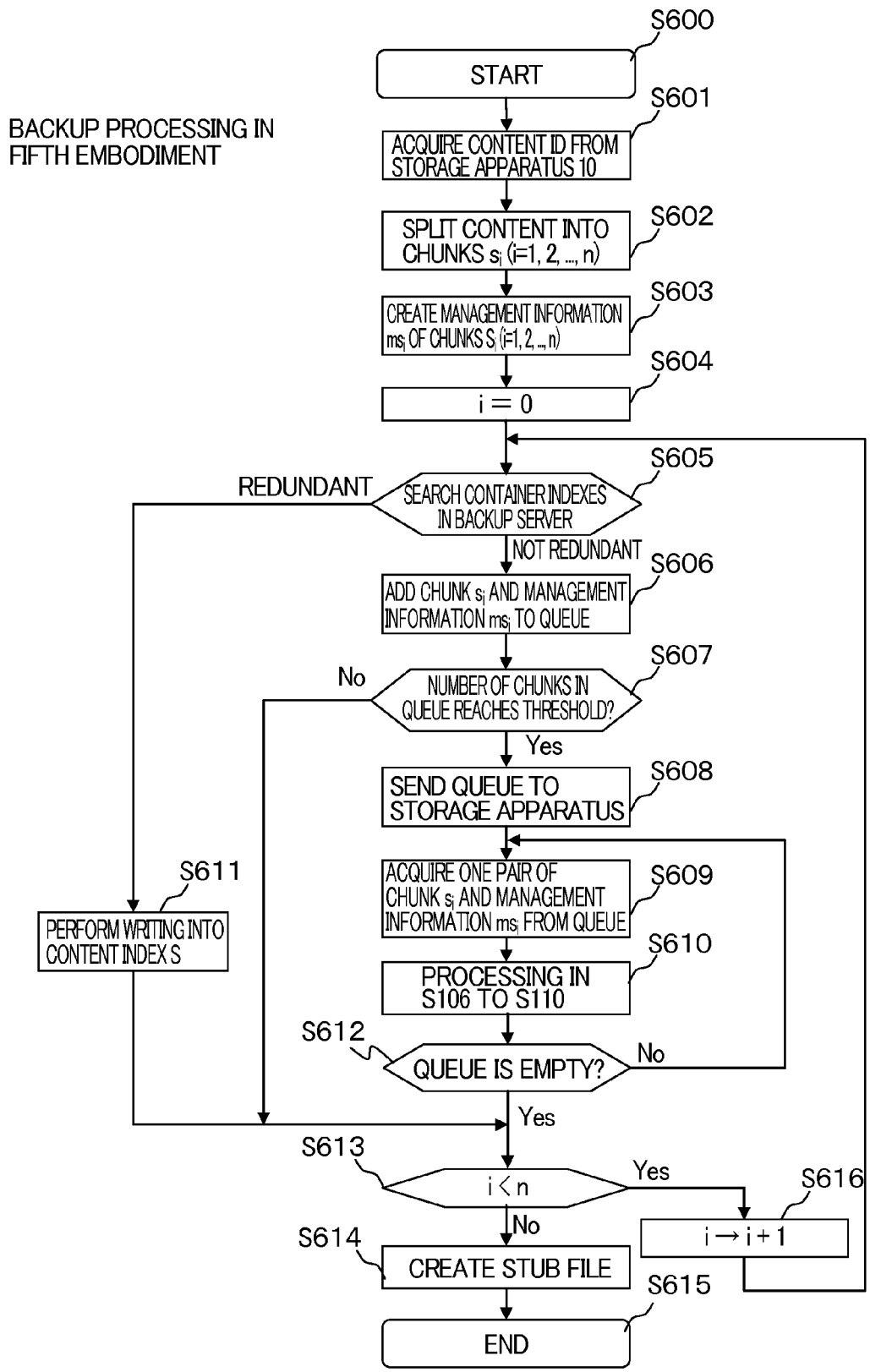
FIG. 16 is a flowchart illustrating an example of a processing procedure in backup processing according to a fifth embodiment.

Firstly, the backup processing executed by the storage system 1 in this embodiment is explained. FIG. 16 illustrates a processing flow example of a backup processing operation in this embodiment. The backup processing illustrated in FIG. 16 is executed by the backup program 106 of the backup server 14 and the backup program 116 of the storage apparatus 10.

The backup program 106 of the backup server 14 receives an instruction to execute the backup processing from the client 6 or the like, and then starts the backup processing in this embodiment (S600). The processing in S601 to S604 executed thereafter is the same as the processing in S101 to S104 in the first embodiment, and therefore the detailed description thereof is omitted herein.

When determining that the chunk $s_i$ having the finger print 321 matching the finger print of the processing target chunk is found in the container indexes 320 in the backup server 14 (i.e., determining "redundant") in S605, the backup program 106 of the backup server 14 records the management information $ms_i$ of the chunk $s_i$ into the content index 370 for restore processing (S611). On the other hand, when determining that there is no chunk having the finger print 321 matching the finger print of the processing target chunk (i.e., determining "not redundant") in S605, the backup program 106 of the backup server 14 performs processing in S606.

The backup program 106 of the backup server 14 performs the processing in S606 by adding the chunk $s_i$ and the management information $ms_i$ thereof to a queue prepared, for example, in the memory 103 of the backup server 14. The queue is provided to store chunks $s_i$ each determined as "not redundant" as a result of the redundancy determination processing in S604 and the management information $ms_i$ of the chunks $s_i$ up to a number predetermined as a threshold. In this configuration, information on the chunk $s_i$ determined as "not redundant" is not sent to the storage apparatus 10 after every redundancy determination.

When determining that the number of chunks $s_i$ stored in the queue reaches the threshold in S607 (S607, Yes), the backup program 106 of the backup server 14 performs processing in S608.

On the other hand, when determining that the number of chunks $s_i$ stored in the queue is smaller than the threshold in S607 (S607, No), the backup program 106 of the backup server 14 performs processing in S613.

In S608, the backup program 106 of the backup server 14 sends the storage apparatus 10 the queue storing therein the chunks $s_i$ determined as "not redundant" in S605 and the management information $ms_i$ of the chunks $s_i$.

In S609, the backup program 116 of the storage apparatus 10 takes out the first pair of the chunk $s_i$ and the management information $ms_i$ of the chunk $s_i$ from the head of the queue acquired from the backup server 14.

On the chunk $s_i$ and the management information $ms_{if}$ of the chunk $s_i$ thus taken out, the backup program 116 of the storage apparatus 10 performs the redundancy determination processing and the registration processing in the container, the container index and the chunk index, which are the same as the processing in S106 to S111 in FIG. 5 in the first embodiment (S610). After the processing equivalent to S111, the backup program 116 of the storage apparatus 10 performs processing in S612.

The backup program 116 of the storage apparatus 10 performs processing in S613 when determining that the queue acquired from the backup server 14 is empty in S612 (S612, Yes), or returns the processing to S609 when determining that the chunk still remains in the queue (S612, No).

Thereafter, the backup program 106 of the backup server 14 determines whether the redundancy determination processing and the registration processing in the container, the container index and the chunk index are completed for all the chunks (S613). Specifically, the backup program 106 of the backup server 14 compares the number n of chunks included in the backup processing target content with the count number of the counter i.

When determining that the redundancy determination processing and the registration processing in the container, the container index and the chunk index are completed for all the chunks in S613 (S613, No), the backup program 106 of the backup server 14 creates a stub file for restore processing (S614), and terminates the backup processing of the target content (S615). The stub file stores the content ID 371 for searching for the content index 370 of a restore target during execution of the restore processing.

On the other hand, when determining that the redundancy determination processing and the registration processing in the container, the container index and the chunk index are completed for all the chunks in S613 (S613, Yes), the backup program 106 of the backup server 14 adds one to the counter i, and returns the processing to S605 (S616).

Detailed Operation of Restore Processing

The restore processing according to this embodiment is substantially the same as the restore processing in the first embodiment illustrated in FIG. 6, and therefore the detailed description thereof is omitted herein.

As described above, in this embodiment, the backup server 14 collectively sends the storage apparatus 10 multiple chunks determined as "not redundant," which in turn leads to a reduction in overheads for command analysis and the like in the communication network 4, and accordingly brings further improvement in the processing performance of the de-duplication in the storage system 1.

Sixth Embodiment

Next, description is provided for a storage system 1 according to a sixth embodiment of the present invention.

Configuration of Storage System 1 in Sixth Embodiment

An overall configuration of the storage system 1 in this embodiment is the same as in the first embodiment illustrated in FIG. 1, and therefore the detailed description thereof is omitted herein. In addition, the block configurations of the backup server 14 and the storage apparatus 10 are the same in the first embodiment illustrated in FIG. 2, and therefore the detailed description thereof is omitted herein.

Backup Processing and Restore Processing of Storage System 1 in Sixth Embodiment Next, description is provided for the backup processing and the restore processing executed by the storage system 1 in this embodiment.

Detailed Operation of Backup Processing

Figure 17:
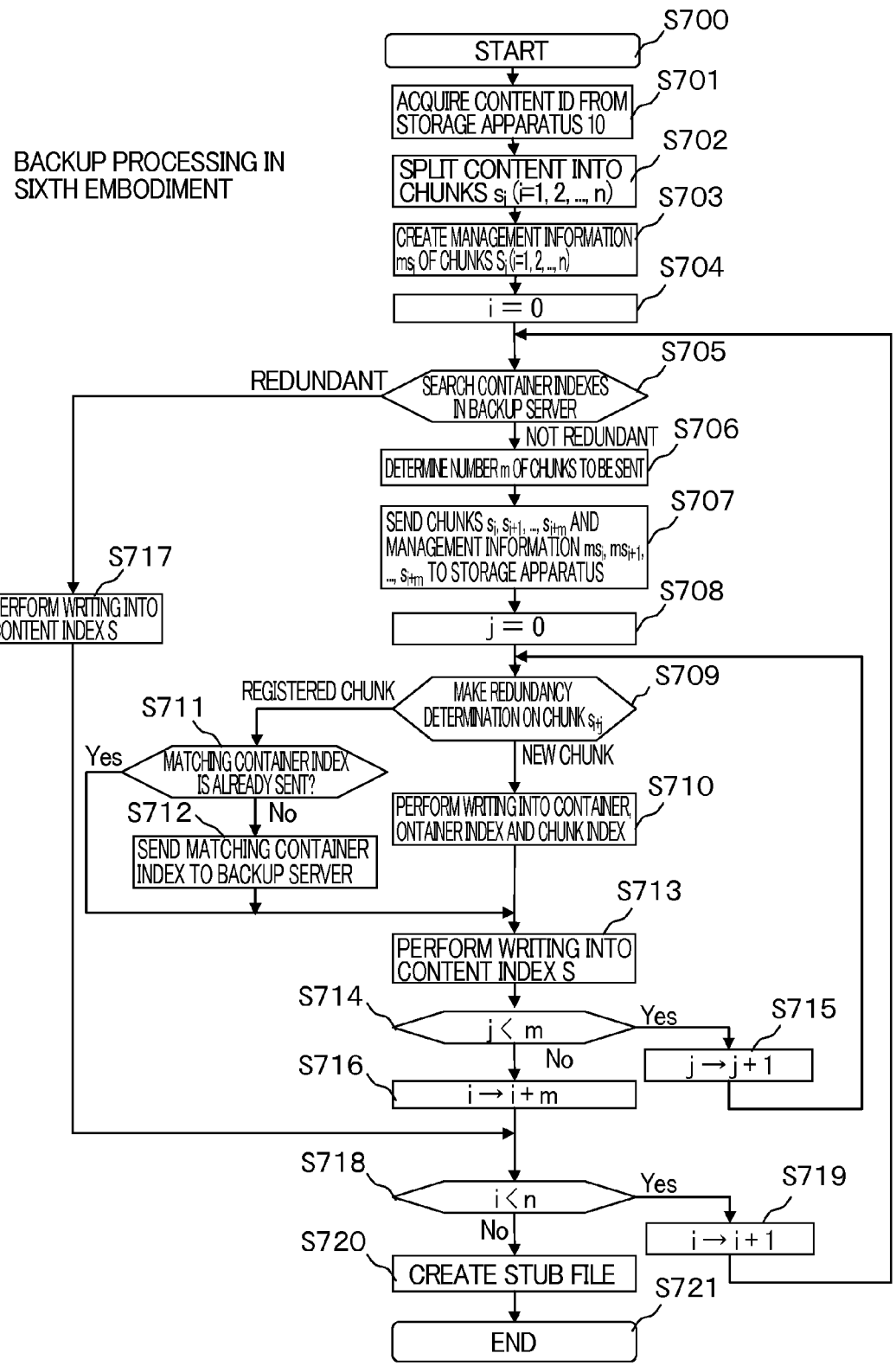
FIG. 17 is a flowchart illustrating an example of a processing procedure in backup processing according to a sixth embodiment.

Firstly, the backup processing executed by the storage system 1 in this embodiment is explained. FIG. 17 illustrates a processing flow example of a backup processing operation according to this embodiment.

The backup program 106 of the backup server 14 receives an instruction to execute the backup processing from a client 6 or the like, and starts the backup processing in this embodiment (S700). The processing in S701 to S704 executed thereafter is the same as the processing in S101 to S104 in the first embodiment, and therefore the detailed description thereof is omitted herein.

When determining that the chunk $s_i$ having the finger print 321 matching the finger print of the processing target chunk is found in the container indexes 320 in the backup server 14 (i.e., determining "redundant") in S705, the backup program 106 of the backup server 14 registers the chunk into the content index 370 for restore processing (S717). On the other hand, when determining that there is no chunk $s_i$ having the finger print 321 matching the finger print of the processing target chunk (i.e., determining "not redundant") in S705, the backup program 106 of the backup server 14 performs processing in S706.

In S706, the backup program 106 of the backup server 14 determines a number m of chunks (i+m≤n) indicating the number of chunks $s_i$ to be sent to the storage apparatus 10 at a time.

In S707, the backup program 106 of the backup server 14 sends the chunks $s_i$, $s_{i+1}$, . . . , $s_{i+m}$ and the management information $ms_i$, $ms_{i+1}$, . . . , $ms_{i+m}$ to the storage apparatus 10.

The backup program 116 of the storage apparatus 10 initializes a counter j (j=0) in S708, and then performs processing in S709. The counter j is used by the backup program 116 of the storage apparatus 10 to determine whether the processing on m chunks is completed.

In S709, the backup program 116 of the storage apparatus 10 performs the redundancy determination processing on the chunk $s_{i+j}$. When determining that the chunk $s_{i+j}$ is a new chunk, the backup program 116 of the storage apparatus 10 records the chunk $s_{i+j}$ into the container 380, records the management information $ms_{i+j}$ of the chunk $s_{i+j}$ into the container index 320, records the message digest of the chunk $s_{i+j}$ into the chunk index 310 (S710), and then advances the processing to S713.

When determining that the chunk $s_{i+j}$ is a redundant chunk in S709, the backup program 116 of the storage apparatus 10 determines whether or not the corresponding container index 320 is already sent to the backup server 14 (S711).

When determining that the corresponding container index 320 is already sent to the backup server 14 in S711 (S711, Yes), the backup program 116 of the storage apparatus 10 performs processing in S713. On the other hand, when determining that the corresponding container index 320 is not sent to the backup server 14 yet (S711, No), the backup program 116 of the storage apparatus 10 sends the corresponding container index 320 to the backup server 14 (S712), and then performs the processing in S713.

In S713, the backup program 116 of the storage apparatus 10 records the management information of the chunk into the content index 370 for restore processing.

After that, the backup program 116 of the storage apparatus 10 determines whether or not the redundancy determination processing and the registration processing in the container, the container index and the chunk index are completed for all the chunks received from the backup server 14 (S714). Specifically, the backup program 116 of the storage apparatus 10 compares the number m of received chunks with the count number of the counter j.

When determining that the redundancy determination processing and the registration processing in the container, the container index and the chunk index are completed for all the chunks in S714 (S714, No), the backup program 116 of the storage apparatus 10 performs processing in S716. Or, when determining that the redundancy determination processing and the registration processing in the container, the container index and the chunk index are not completed for all the chunks in S714 (S714, Yes), the backup program 116 of the storage apparatus 10 adds one to the counter j, and returns the processing to S709 (S715).

In S716, the backup program 106 of the backup server 14 adds the number m of chunks sent to the storage apparatus 10 to the counter i.

Thereafter, the backup program 106 of the backup server 14 determines whether the redundancy determination processing and the registration processing in the container, the container index and the chunk index are completed for all the chunks (S718).

When determining that the redundancy determination processing and the registration processing in the container, the container index and the chunk index are completed for all the chunks (S718, No), the backup program 106 of the backup server creates a stub file for restore processing (S720), and terminates the backup processing of the target content (S721).

On the other hand, when determining that the redundancy determination processing and the registration processing in the container, the container index and the chunk index are not completed for all the chunks in S718 (S718, Yes), the backup program 106 of the backup server 14 adds one to the counter i, and returns the processing to S705 (S719).

Note that one example of a method of determining the number m of chunks in S706 is to give a threshold according to the total size of chunks $s_i$, $s_{i+1}$, . . . , $s_{i+m}$ and the management information $ms_i$, $ms_{i+1}$, . . . , $ms_{i+m}$. For example, the backup program 106 of the backup server 14 can send all the chunks to the storage apparatus 10 when determining that the size of the backup target content is smaller than the threshold. Similarly, when determining that the total size of chunks unprocessed in the de-duplication is smaller than the threshold, the backup program 106 of the backup server 14 may send all the unprocessed chunks to the storage apparatus 10.

With the above configuration, this embodiment enables further improvement in the processing performance of the de-duplication. For example, when the total size of chunks and the management information to be sent is smaller than the size of the container index 320, the traffic volume of the network can be reduced, which leads to further improvement in the processing performance of the storage system 1.

Detailed Operation of Restore Processing

The restore processing according to this embodiment is substantially the same as the restore processing in the first embodiment illustrated in FIG. 6, and therefore the detailed description thereof is omitted herein.

As described above, in this embodiment, the backup server 14a sends the storage apparatus 10 a chunk determined as "not redundant" and the following chunks collectively, which in turn leads to a reduction in overheads for command analysis and the like in the communication network 4, and accordingly brings further improvement in the processing performance of the de-duplication. In addition, in this embodiment, the number of chunks to be sent collectively is set according to the data volume to be sent, whereby the processing performance of the de-duplication can be further improved.

Seventh Embodiment

Next, description is provided for a storage system 1 according to a seventh embodiment of the present invention.
Configuration of Storage System 1 in Seventh Embodiment An overall configuration of the storage system 1 in this embodiment is the same as in the first embodiment illustrated in FIG. 1, and therefore the detailed description thereof is omitted herein. In addition, the block configurations of the backup server 14 and the storage apparatus 10 are the same in the first embodiment illustrated in FIG. 2, and therefore the detailed description thereof is omitted herein.

Backup Processing and Restore Processing of Storage System 1 in Seventh Embodiment Next, description is provided for the backup processing and the restore processing executed by the storage system 1 in this embodiment.

Detailed Operation of Backup Processing

Figure 18:
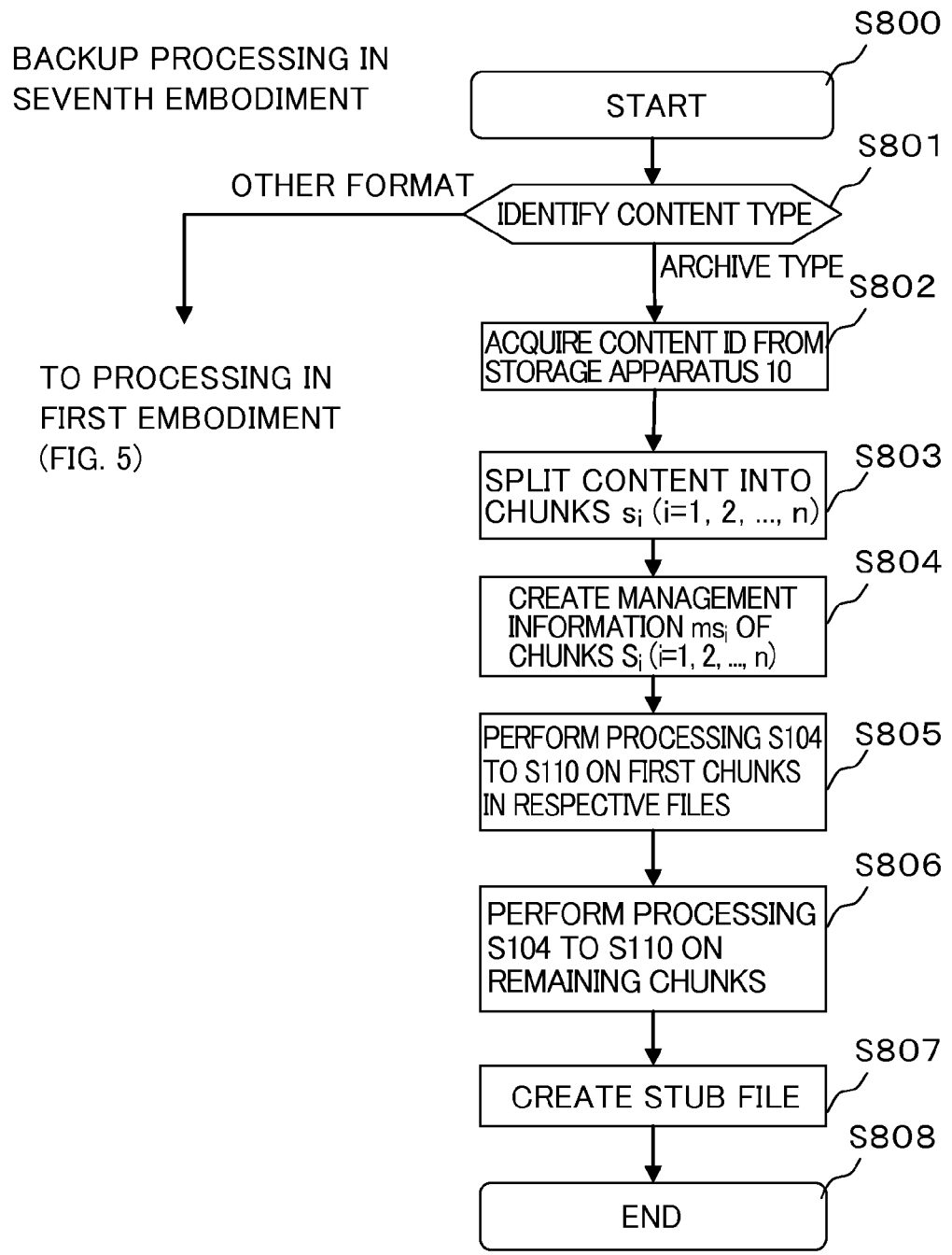
FIG. 18 is a flowchart illustrating an example of a processing procedure in backup processing according to a seventh embodiment.

Firstly, the backup processing executed by the storage system 1 in this embodiment is explained. FIG. 18 illustrates a processing flow example of a backup processing operation according to this embodiment.

The backup program 106 of the backup server 14 receives an instruction to execute the backup processing from a client 6 or the like, and starts the backup processing in this embodiment (S800). In S801 executed thereafter, the backup program 106 of the backup server 14 identifies a type of a backup target content.

When determining that the content is of a content type, such as an archive file, a backup file, or a virtual volume file, having a format in which general files are gathered, and in which the gathered files are each identifiable (S801, archive type), the backup program 106 of the backup server 14 performs processing in S803. For example, there is an archive file in which file information on each of gathered files is stored as a header. In an archive file of this type, the storage location of each of the gathered files in the content can be identified as the location of the header. This embodiment can be applied to a file in a format other than the archive file, if the content includes information allowing the storage locations of gathered files to be identified.

On the other hand, when determining that the backup target content is a file other than the foregoing ones (a file not including information allowing the storage locations of gathered files to be identified) (S801, other format), the backup program 106 of the backup server 14 performs the same processing as the backup processing in the first embodiment illustrated in FIG. 5.

When determining that the backup target content is of the archive type in S801, the backup program 106 of the backup server 14 acquires the content ID 371 for specifying the backup target content from the storage apparatus 10 (S802). Then, the backup program 106 of the backup server 14 splits the content into multiple chunks, and creates the management information of each chunk (S803, S804).

Then, in S805, the backup program 106 of the backup server 14 retrieves the first chunk in each of the files gathered in the content and performs the de-duplication on the first chunk. The de-duplication in S805 is the same as in S104 to S110 in the backup processing of the first embodiment.

Subsequently, in S806, the backup program 106 of the backup server 14 performs the de-duplication on the remaining chunks. The de-duplication in S806 is also the same as in S104 to S110 in the backup processing of the first embodiment.

The backup program 106 of the backup server 14 creates a stub file for restore processing in S807, and terminates the backup processing of the target content (S808).

Since the container 380 is created in consideration of the locality as described above, necessary container indexes 320 are highly likely to be different among files gathered in a content. For this reason, when all the container indexes 320 needed for the whole content are acquired in advance, the de-duplication can be performed more efficiently.

In addition, in the processing flow example in FIG. 18, the de-duplication is firstly performed only on the first chunks in the respective files gathered in the content. Instead, chunks other than the first chunks may be chosen by sampling and the de-duplication may be firstly performed on the chosen chunks. For example, when a file included in a content is large in size, the file is split into two or more container indexes 320 in some cases. For this reason, multiple chunks may be chosen from a single file, and the de-duplication may be performed on the chosen chunks firstly.

Moreover, in the processing flow example in FIG. 18, the de-duplication is firstly performed only on the first chunks in all the files gathered in the content. Instead, the de-duplication may be performed on every several files. When a content is large in size, there is a possibility that the processing performance of the redundancy determination by the backup program 106 may be reduced because all the container indexes cannot be stored on the memory 103 of the backup server 14. To avoid this, the de-duplication may be performed on the gathered files one by one, and the de-duplication may be firstly performed only on the first chunk of a file to be processed next.

Detailed Operation of Restore Processing

The restore processing according to this embodiment is substantially the same as the restore processing in the first embodiment illustrated in FIG. 6, and therefore the detailed description thereof is omitted herein.

As described above, this embodiment enables more efficient de-duplication for a content having a format in which general files are gathered, such as an archive file, by identifying each of the gathered files, and by firstly acquiring the container indexes to be used for the redundancy determination of the files.

Hereinabove, the present invention has been described based on the various embodiments, but these embodiments are intended to facilitate understanding of the present invention but are not intended to impose limitation on the interpretation of the present invention. The present invention can be altered or modified without departing from the spirit of the present invention, and also includes equivalents of the invention.

The invention claimed is:

1. A storage system to store data from an external apparatus in a unit of content, comprising:
    a backup apparatus configured to execute backup processing to create backup data of the data from the external apparatus in the unit of content; and
    a storage apparatus coupled to the backup apparatus and configured to store the backup data received from the backup apparatus, wherein
    the backup apparatus includes:
        first redundancy determination information that is information for determining whether or not a content of the backup data is already stored in the storage apparatus, and
        a first backup processing part configured to determine whether or not the content is already stored in the storage apparatus by using the first redundancy determination information,
    the storage apparatus includes:
        second redundancy determination information that is information for determining whether or not the content of the backup data is already stored in the storage apparatus, and
        a second backup processing part configured to determine whether or not the content is already stored in the storage apparatus by using the second redundancy determination information, and when the first backup processing part determines that the content of the backup data is not stored in the storage apparatus and the second backup processing part determines that the content is stored in the storage apparatus, the second backup processing part sends the second redundancy determination information to the backup apparatus, and the first backup processing part of the backup apparatus incorporates the received second redundancy determination information into the first redundancy determination information, wherein at least one management apparatus and a plurality of the storage apparatuses each including neither the second redundancy determination information nor the second backup processing part are coupled to the backup apparatus in a communication configured manner, the management apparatus includes:
  the second redundancy determination information of each of the storage apparatuses, and
  the second backup processing part, and the second backup processing part of the management apparatus receives a determination result based on the first redundancy determination information from the first backup processing part of the backup apparatus, when the determination result indicates that the backup target content is not stored in any of the storage apparatuses, the second backup processing part also determines whether or not the content is stored in each of the storage apparatuses by using the second redundancy determination information, and when determining that the content is stored in any of the storage apparatuses, the second backup processing part sends the second redundancy determination information to the backup apparatus.

2. The storage system according to claim 1, wherein in the first redundancy determination information and the second redundancy determination information, a backup target content is split by a predetermined size into a plurality of unit-data segments, and each of the unit-data segments and unit-data segment unique information which is information obtained uniquely to the unit-data segment are stored in association with each other.

3. The storage system according to claim 2, wherein the backup apparatus includes:
  restore information that is information for identifying the content stored in the storage apparatus, and
  a first restore processing part configured to send the storage apparatus the restore information for identifying a restore target content when performing restore processing, the storage apparatus includes a second restore processing part configured to identify the restore target content from the restore information received from the backup apparatus, identify the unit-data segments constituting the identified content by using the second redundancy determination information, restore the identified unit-data segments to the content, and send the obtained content to the backup apparatus.

4. The storage system according to claim 2, wherein the backup apparatus includes a unit-data segment storage area capable of storing a predetermined number of pairs of the unit-data segments and the unit-data segment unique information, and the first backup processing part of the backup apparatus sends the pairs of the unit-data segments and the unit-data segment unique information to the storage apparatus when determining that the number of pairs of the unit-data segments and the unit-data segment unique information reaches the predetermined number.

5. The storage system according to claim 2, wherein the first backup processing part of the backup apparatus determines whether or not one of the unit-data segments is stored in the storage apparatus by using the first redundancy determination information, when determining that the unit-data segment is not stored, the first backup processing part calculates the number of the unit-data segments to be sent to the storage apparatus from among the unit-data segments constituting the backup target content according to a preset upper limit data size, and sends the storage apparatus the calculated number of the unit-data segments including the unit-data segment determined as not stored and consecutively following unit-data segments.

6. The storage system according to claim 1, wherein a plurality of the storage apparatuses are coupled to the backup apparatus in a communication-enabled manner, the second backup processing part of each of the storage apparatuses receives a determination result based on the first redundancy determination information from the first backup processing part of the backup apparatus, when the determination result indicates that the backup target content is not stored in the storage apparatus, the second backup processing part of each of the storage apparatuses also determines whether or not the content is stored in the storage apparatus by using the second redundancy determination information, and when determining that the content is stored, the second backup processing part sends the second redundancy determination information to the backup apparatus.

7. The storage system according to claim 1, wherein at least the backup apparatus includes a network monitor part configured to monitor a traffic of a communication network through which the backup apparatus and the storage apparatus are coupled to each other in a communication-enabled manner, in a case where the network monitor part determines that a network load of the communication network is equal to or larger than a predetermined threshold when the first backup processing part is about to send the backup target content to the storage apparatus, the first backup processing part sends only unique information for identifying the content to the storage apparatus without sending data of the content.

8. The storage system according to claim 1, wherein when the first backup processing part of the backup apparatus determines that the backup target content is archive data including a group of files partitioned by partition information recognizable by the first backup processing part, the first backup processing part and the second backup processing part:

perform processing, for unit-data segments located at the heads of the respective files constituting the content, and when the first backup processing part determines that any of the first unit-data segments is not stored in the storage apparatus while the second backup processing part determines that the first unit-data segment is stored in the storage apparatus, the second backup processing part sends the second redundancy determination information to the backup apparatus, and the first backup processing part of the backup apparatus incorporates the received second redundancy determination information into the first redundancy determination information, and the first backup processing part and the second backup processing part:

perform processing for the second and following unit-data segments in each of the files sequentially.

9. A method of controlling a storage system to store data from an external apparatus on each content basis, wherein the storage system includes a backup apparatus configured to execute backup processing to create backup data of the data from the external apparatus in a unit of content; and a storage apparatus coupled to the backup apparatus and configured to store the backup data received from the backup apparatus, the backup apparatus determines whether or not the content of the backup data is stored in the storage apparatus, and determines whether or not the content is stored in the first storage apparatus by using the first redundancy determination information, the storage apparatus includes:

second redundancy determination information that is information for determining whether or not the content of the backup data is already stored in the storage apparatus, and a second backup processing part configured to determine whether or not the content is already stored in the storage apparatus by using the second redundancy determination information, and when the first backup processing part determines that the content of the backup data is not stored in the storage apparatus and the second backup processing part determines that the content is already stored in the storage apparatus, the second backup processing part sends the second redundancy determination information to the backup apparatus, and the first backup processing part of the backup apparatus incorporates the received second redundancy determination information into the first redundancy determination information, wherein at least one management apparatus and a plurality of the storage apparatuses each including neither the second redundancy determination information nor the second backup processing part are coupled to the backup apparatus in a communication configured manner, the management apparatus includes:

the second redundancy determination information of each of the storage apparatuses, and the second backup processing part, and the second backup processing part of the management apparatus receives a determination result based on the first redundancy determination information from the first backup processing part of the backup apparatus, when the determination result indicates that the backup target content is not stored in any of the storage apparatuses, the second backup processing part also determines whether or not the content is stored in each of the storage apparatuses by using the second redundancy determination information, and when determining that the content is stored in any of the storage apparatuses, the second backup processing part sends the second redundancy determination information to the backup apparatus.

10. The method of controlling a storage system according to claim 9, wherein in the first redundancy determination information and the second redundancy determination information, a backup target content is split by a predetermined size into a plurality of unit-data segments, and each of the unit-data segments and unit-data segment unique information which is information obtained uniquely to the unit-data segment are stored in association with each other.

* * * * *